United States Patent
Dudar

(10) Patent No.: US 11,072,251 B2
(45) Date of Patent: Jul. 27, 2021

(54) SYSTEMS AND METHODS FOR INCREASING VEHICLE ENERGY SUPPLY

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 16/266,987

(22) Filed: Feb. 4, 2019

(65) Prior Publication Data
US 2020/0247252 A1 Aug. 6, 2020

(51) Int. Cl.
*B60L 53/14* (2019.01)
*B60L 53/302* (2019.01)
(Continued)

(52) U.S. Cl.
CPC ........ *B60L 53/14* (2019.02); *B60K 15/03504* (2013.01); *B60L 53/302* (2019.02); *B60L 53/53* (2019.02); *B60L 53/62* (2019.02); *B60S 5/02* (2013.01); *F02D 41/004* (2013.01); *F02D 41/0032* (2013.01); *F02M 25/0836* (2013.01); *H02J 1/14* (2013.01); *H02J 7/1423* (2013.01); *B60K 2015/03514* (2013.01); *F02M 2025/0881* (2013.01)

(58) Field of Classification Search
CPC ........ B60L 53/14; B60L 53/302; B60L 53/53; B60L 53/62; B60K 15/03504; B60K 2015/03514; F02D 41/0032; F02D 41/004; F02M 25/0836; F02M 2025/0881; B60S 5/02; H02L 1/14; H02L 7/1423
See application file for complete search history.

(56) References Cited

U.S. PATENT DOCUMENTS

| 4,450,545 A | 5/1984 | Kishi et al. |
| 6,510,416 B1 | 1/2003 | Lad |

(Continued)

FOREIGN PATENT DOCUMENTS

CN 104658068 A 5/2015

OTHER PUBLICATIONS

Dudar, A., "Systems and Methods for Fuel System Pressure Sensor Rationalization," U.S. Appl. No. 16/148,575, filed Oct. 1, 2018, 84 pages.

(Continued)

*Primary Examiner* — Hieu T Vo
(74) *Attorney, Agent, or Firm* — Geoffrey Brumbaugh; McCoy Russell LLP

(57) ABSTRACT

Methods and systems are provided for preparing an energy receiving apparatus of a vehicle for receiving an increase in a level of energy storage prior to a vehicle reaching an energy replenishment station for receiving the increase. In one example, a method comprises preparing an energy receiving apparatus for receiving an increase in a level of energy storage while the vehicle is traveling to the energy replenishment station, in response to a vehicle operator confirming at the controller an intent to stop at the energy replenishment station to increase the level of energy storage at the energy receiving apparatus. In this way, a time-frame for increasing the energy level increase may be reduced as compared to situations where such preparations are not undertaken.

20 Claims, 14 Drawing Sheets

(51) Int. Cl.
*H02J 7/14* (2006.01)
*B60L 53/62* (2019.01)
*H02J 1/14* (2006.01)
*B60L 53/53* (2019.01)
*B60K 15/035* (2006.01)
*B60S 5/02* (2006.01)
*F02M 25/08* (2006.01)
*F02D 41/00* (2006.01)

(56) References Cited

U.S. PATENT DOCUMENTS

| | | | |
|---|---|---|---|
| 8,869,777 B2 | 10/2014 | Espinoza | |
| 9,415,680 B2 | 8/2016 | Dudar et al. | |
| 9,644,552 B2 | 5/2017 | Dudar | |
| 9,745,907 B2 * | 8/2017 | Dudar | F02M 25/0836 |
| 9,809,441 B2 | 11/2017 | Dudar et al. | |
| 9,873,350 B2 | 1/2018 | Martin et al. | |
| 10,040,448 B2 * | 8/2018 | Dudar | F02D 15/00 |
| 2006/0129407 A1 | 6/2006 | Lee | |
| 2012/0152210 A1 | 6/2012 | Reddy et al. | |
| 2014/0257668 A1 | 9/2014 | Jentz et al. | |

OTHER PUBLICATIONS

Dudar, A., "Systems and Methods for Fuel System Pressure Sensor Rationalization," U.S. Appl. No. 16/148,644, filed Oct. 1, 2018, 80 pages.

Dudar, A., "Systems and Methods for Increasing Vehicle Energy Supply," U.S. Appl. No. 16/266,929, filed Feb. 4, 2019, 109 pages.

Charlton, A., "Alexa in the car: Which vehicles have Alexa integration," Gearbrain Website, Available Online at https://www.gearbrain.com/which-cars-have-amazon-alexa-2525958778.html, Apr. 29, 2019, 10 pages.

* cited by examiner

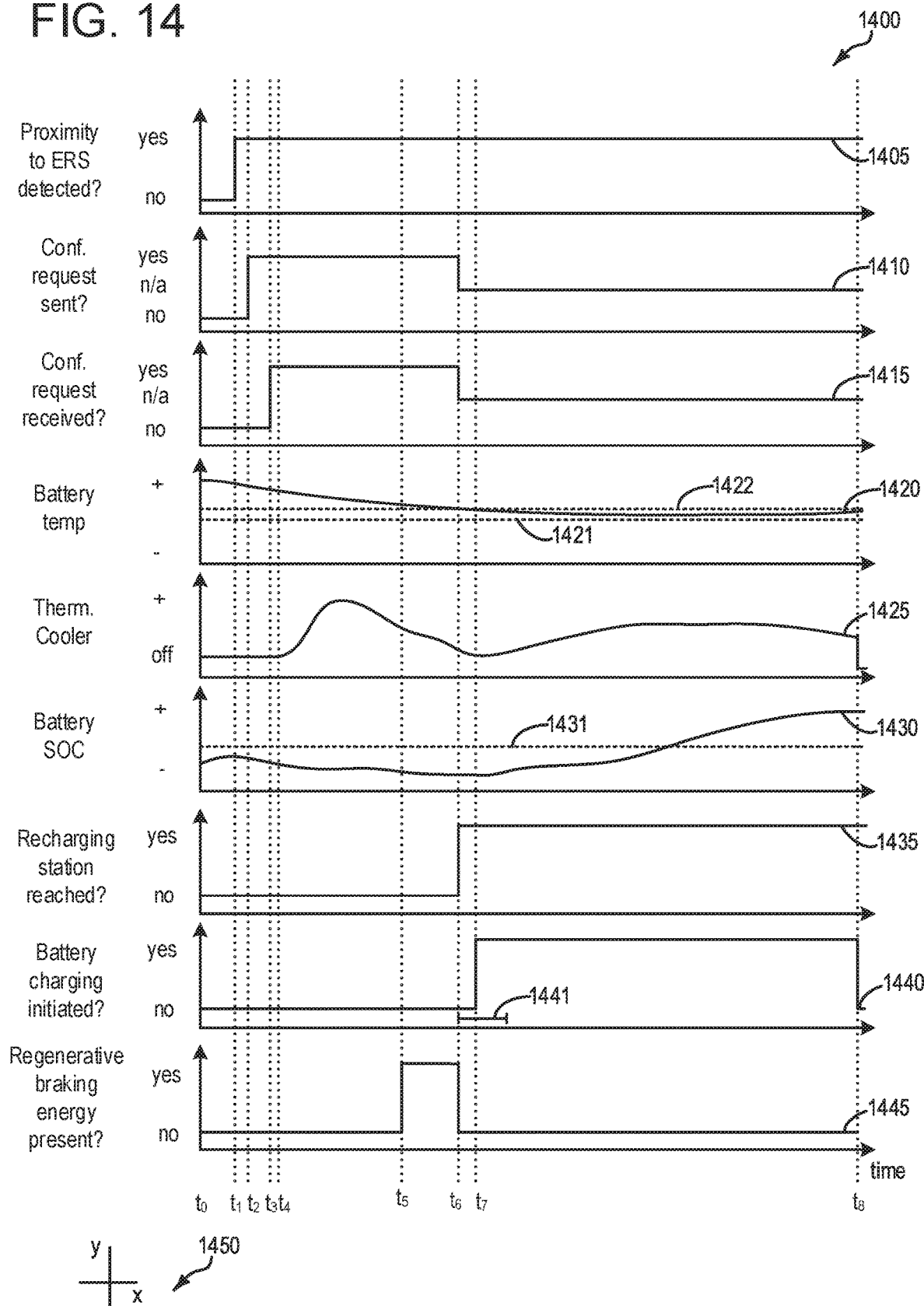

SYSTEMS AND METHODS FOR INCREASING VEHICLE ENERGY SUPPLY

FIELD

The present description relates generally to methods and systems for controlling a manner in which an energy supply that is used to propel the vehicle is increased.

BACKGROUND/SUMMARY

Regardless of the energy source utilized in order to propel a vehicle, periodic stops to increase supply of the energy source are routine. For example, in a vehicle that is propelled at least in part by an engine driven by liquid fuel (e.g. gasoline, diesel), the vehicle may be frequently driven to a refueling station to replenish a fuel tank with liquid fuel. As another example, for hybrid electric vehicles (e.g. plug-in hybrid electric vehicles) that can be propelled at least in part via electrical energy and battery electric vehicles (BEVs), such vehicles may regularly be hooked up to an external power supply (e.g. a recharging station) in order to increase a state-of-charge (SOC) of an onboard energy storage device (e.g. battery).

While such procedures are integral for vehicles regardless of the manner in which they are propelled, replenishing an onboard energy supply can be a time consuming and cumbersome activity for a vehicle operator. Accordingly, reducing a time-frame in which replenishment of an onboard energy supply is achieved may improve customer satisfaction.

As a specific example, U.S. Pat. No. 9,644,552 discloses that a refueling request may comprise detecting a proximity of the vehicle to a refueling station, for example via on onboard global positioning system (GPS) or via wireless communication between the vehicle and a refueling pump. In response to the request, a controller may command a fuel tank of the vehicle to be depressurized. However, the inventors herein have recognized particular issues with such methodology. Specifically, relying on GPS and/or wireless communication between the vehicle and a refueling pump may result a large number of undesired fuel tank depressurizations while the vehicle is in operation, in response to the controller detecting proximity to refueling stations, but where the vehicle operator does not actually intend to refuel the vehicle at the particular detected refueling station. Depending on the drive cycle (e.g. urban city driving), such depressurizations may lead to an overloading of the fuel vapor storage canister, which may result in release of undesired evaporative emissions to atmosphere.

The inventors herein have recognized the above-mentioned issues, and have developed systems and methods to at least partially address them. In one example, a method comprises via a controller, preparing an energy receiving apparatus of a vehicle for receiving an increase in a level of energy storage from an energy replenishment station while the vehicle is traveling to the energy replenishment station, in response to a vehicle operator confirming at the controller an intent to stop at the energy replenishment station to increase the level of energy storage at the energy receiving apparatus. In this way, a time-frame for increasing the level of energy storage at the energy receiving apparatus may be reduced as compared to situations where such preparation is not undertaken. Furthermore, such preparation may in some examples reduce opportunities for release of undesired evaporative emissions to atmosphere as compared to situations where such preparation in not undertaken.

In one example, confirming the intent to stop at the energy replenishment station is in response to a request via the controller to confirm the intent. As one example, the request is generated in response to an indication that the vehicle is within a predetermined proximity to the energy replenishment station. Confirming at the controller the intent to stop may be via an audible or manual confirmation via the operator.

As another example, the energy replenishment station comprises a refueling station and the energy receiving apparatus comprises a fuel tank. In such an example, preparing the energy receiving apparatus of the vehicle may comprise depressurizing the fuel tank while the vehicle is traveling to the refueling station. In another example, preparing the energy receiving apparatus may further comprise controlling a temperature of a fuel vapor storage canister that captures and stores fuel vapors from the fuel tank to below a threshold canister temperature.

In another example, the energy replenishment station comprises a recharging station and the energy receiving apparatus comprises a battery. In such an example, preparing the energy receiving apparatus further comprises controlling a temperature of the energy receiving apparatus to below an upper temperature threshold and to above a lower temperature threshold. In such an example, controlling the temperature increases a rate at which the energy receiving apparatus receives the increase in energy storage as compared to situations where the temperature of the energy receiving apparatus is greater than the upper temperature threshold or below the lower temperature threshold.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 14 depicts an example timeline for managing a temperature of an onboard energy storage device (e.g. a battery) while a vehicle is traveling to a recharging station.

DETAILED DESCRIPTION

The following description relates to systems and methods for preparing an energy receiving apparatus such as a fuel tank or an onboard energy storage device for receiving an increase in energy supply (e.g. liquid fuel or charge, respectively), while the vehicle is traveling to a particular energy replenishment station (e.g. refueling station or recharging station, respectively). More specifically, discussed herein, a proximity to an energy replenishment station may be determined via, for example, one or more of an onboard navigation system, vehicle to vehicle (V2V) and/or vehicle to infrastructure (V2I) communications, learned driving routines stored at the controller and/or onboard navigation system, etc. When such a proximity is detected, the vehicle controller may send an alert to the vehicle operator, requesting confirmation as to whether the vehicle operator intends to stop at the particular energy replenishment station detected. If the vehicle operator confirms that they intend to stop at the particular energy replenishment station, then one or more actions may be commanded via the controller to prepare the vehicle for receiving an increase in energy supply. The actions may pertain to decreasing an amount of time from when the vehicle stops to when energy replenishment (e.g. refueling or recharging) may be initiated. Additionally or alternatively, such actions may pertain to reducing a potential for release of undesired evaporative emissions to environment during the energy replenishment procedure. Additionally or alternatively, such actions may pertain to increasing an efficiency or rate at which the energy replenishment procedure may be conducted. Such methodology discussed herein relates to vehicles powered by liquid fuel (e.g. gasoline, diesel), hybrid electric vehicles (HEVs) which may be operated via some combination of liquid fuel and power from an onboard energy storage device such as a battery, and all-electric vehicles (e.g. EVs, BEVs).

Figure 1:
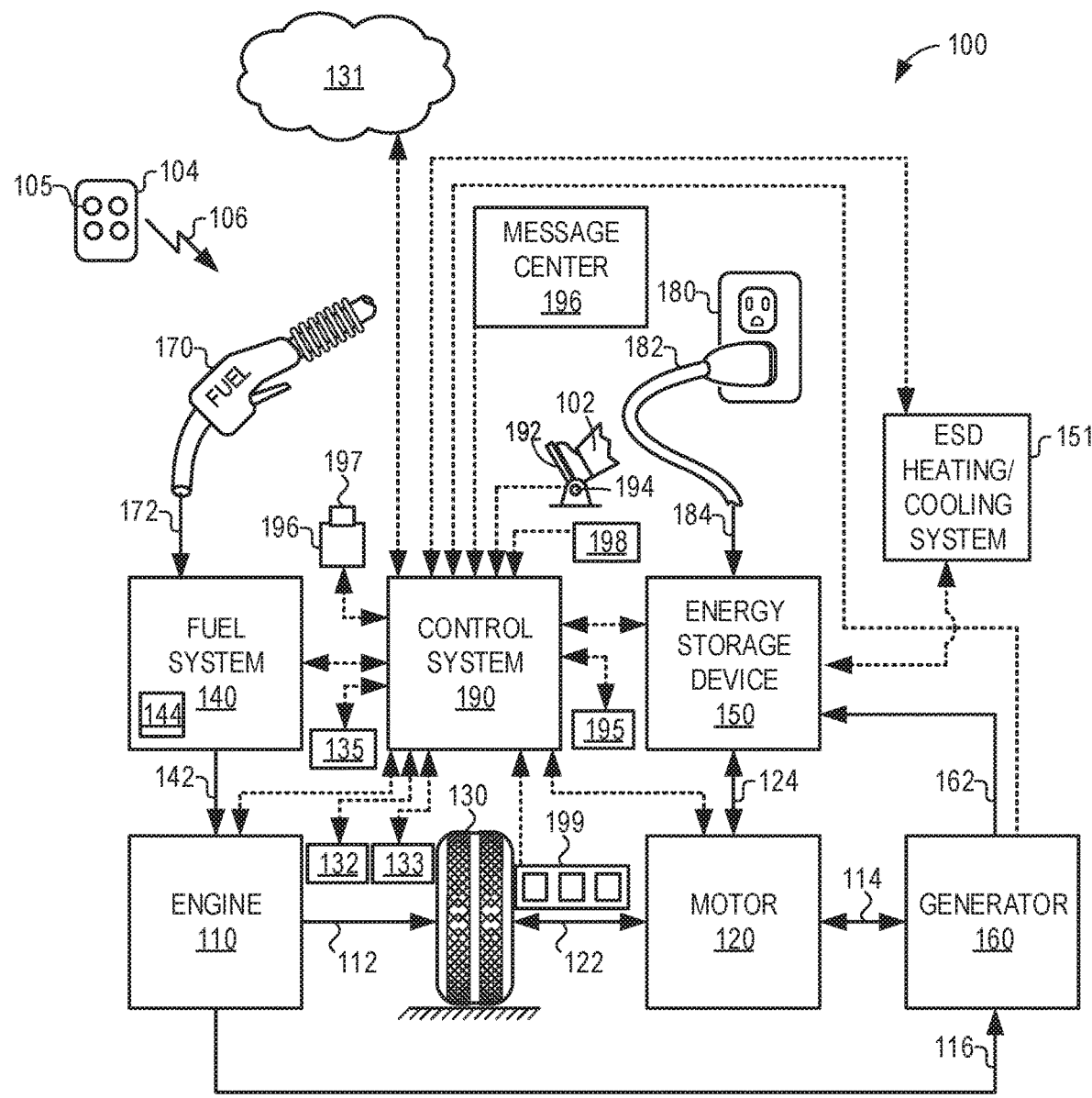
FIG. 1 shows a high-level block diagram illustrating an example vehicle system.
Figure 2:
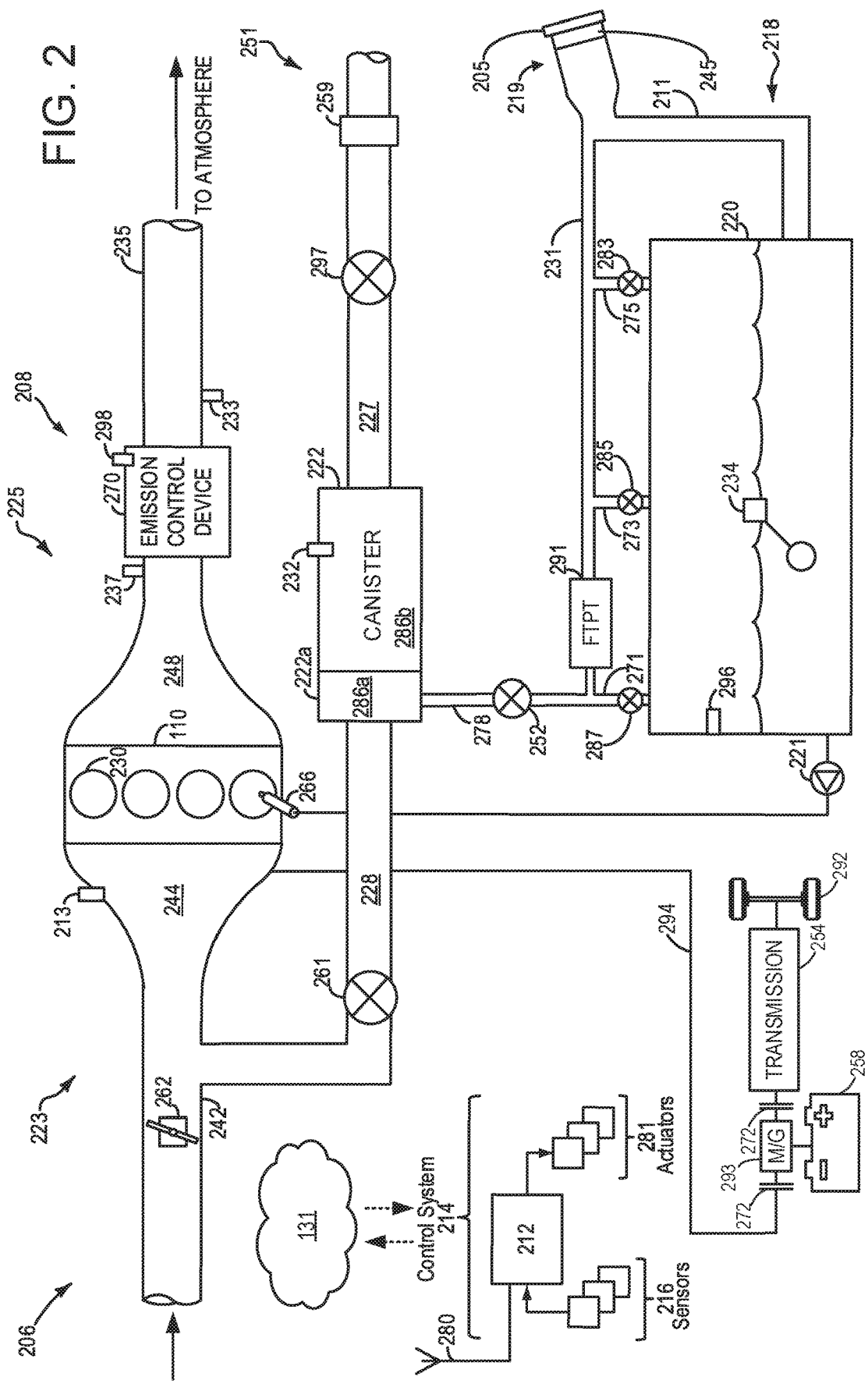
FIG. 2 schematically shows an example vehicle system with a fuel system and an evaporative emissions system.

Accordingly, FIG. 1 depicts a vehicle system for a hybrid electric vehicle. FIG. 2 depicts an example of a vehicle, such as the hybrid vehicle of FIG. 1, that includes a fuel system selectively fluidically coupled to an evaporative emissions system which is in turn selectively fluidically coupled to an engine system. Such an evaporative emissions system may include a fuel vapor storage canister, and temperature management of the canister may be controlled via the system depicted at FIG. 3. For vehicles that include an onboard energy storage device such as a battery, various systems may be included in such vehicles for temperature management of the battery, as depicted in the examples of FIGS. 4-7.

Figure 8:
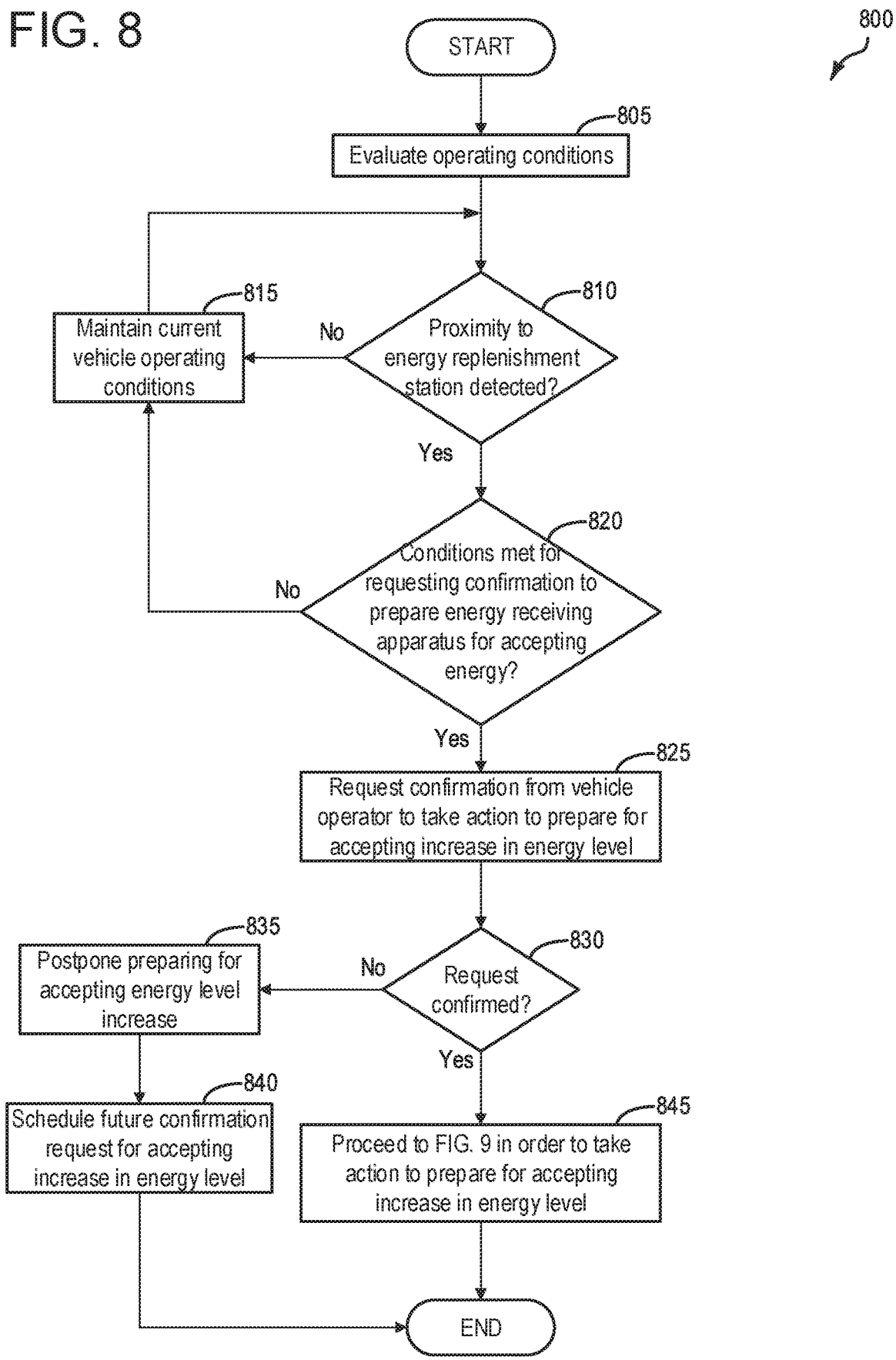
FIG. 8 depicts a high-level example method for requesting confirmation from a vehicle operator as to whether the vehicle operator intends to replenish a vehicle energy receiving apparatus such as a fuel tank and/or a battery, at a particular energy replenishment station.
Figure 9:
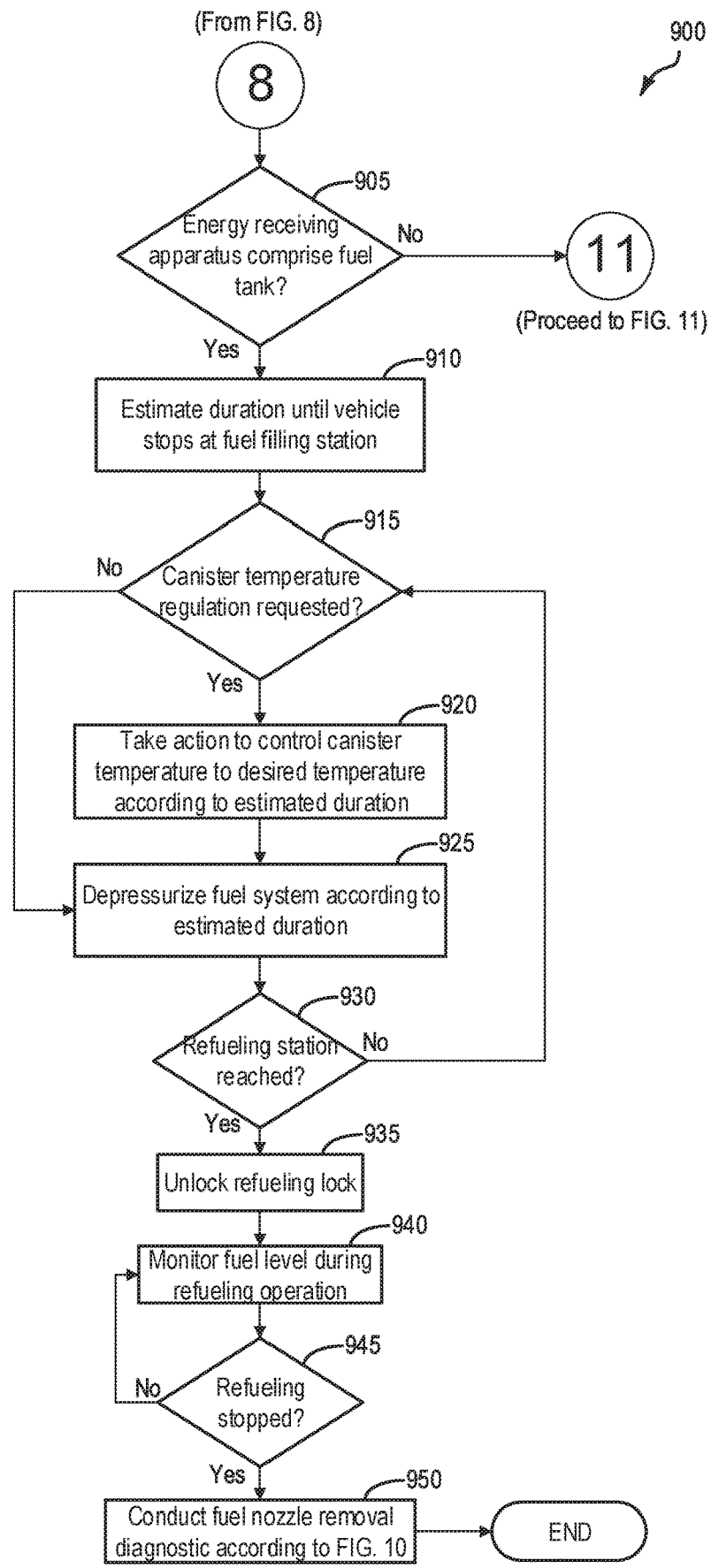
FIG. 9 depicts a high-level example method for managing a temperature of a fuel vapor canister and/or depressurizing a fuel tank while a vehicle is traveling to a refueling station.
Figure 10:
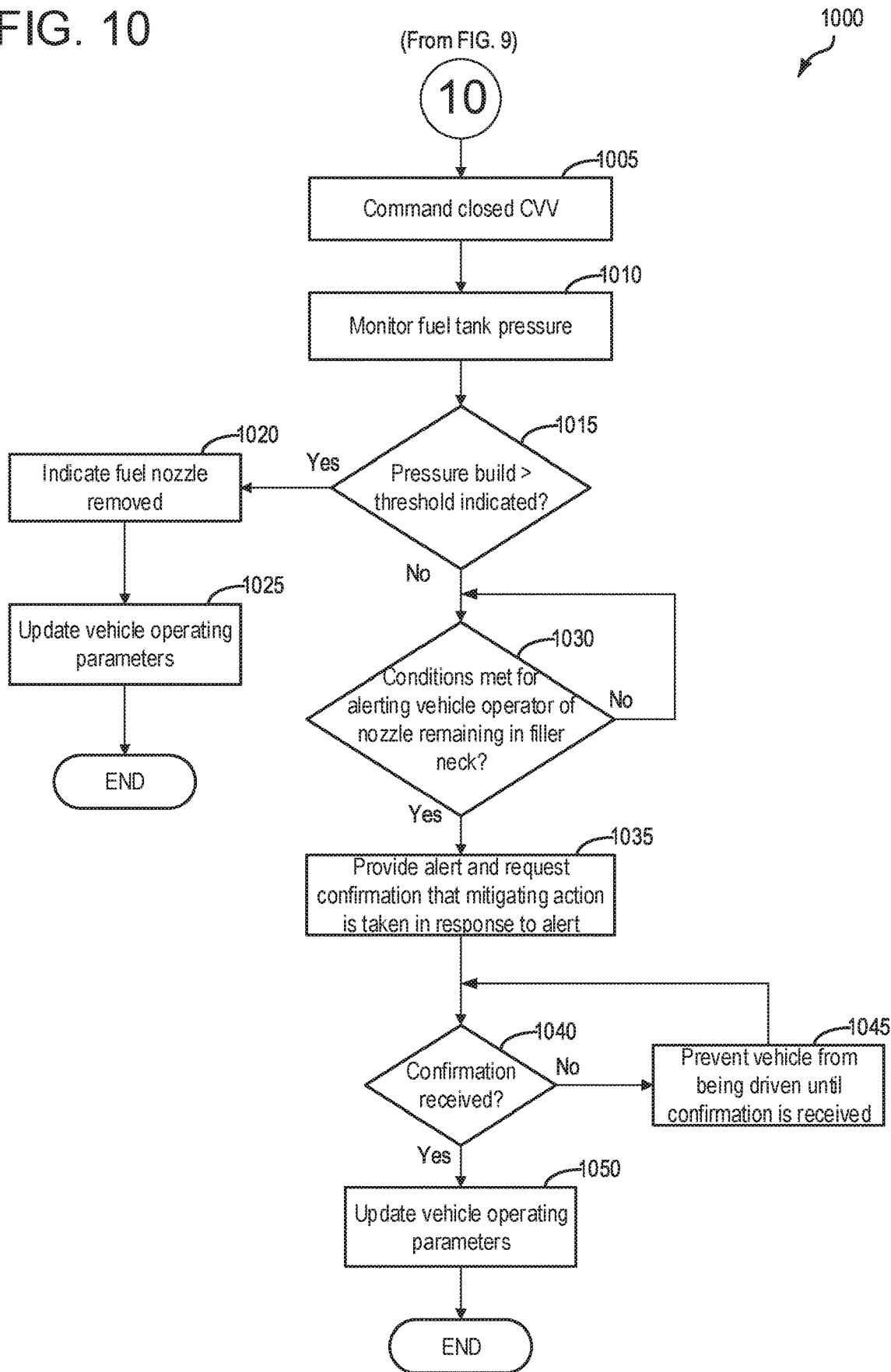
FIG. 10 depicts a high-level example method for conducting a diagnostic to infer whether a refueling nozzle is removed from a fuel filler neck subsequent to a refueling event.
Figure 11:
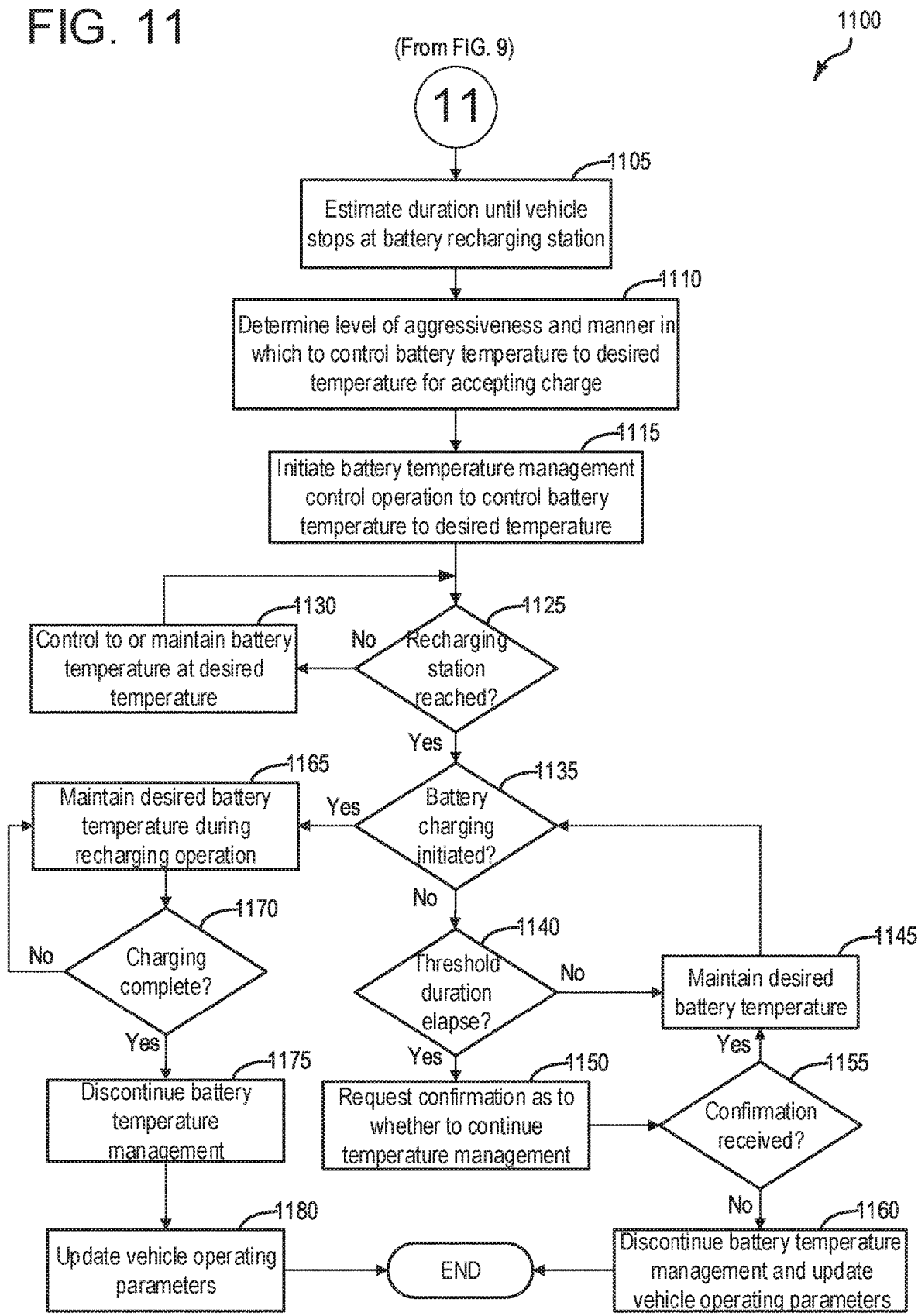
FIG. 11 depicts a high-level example method for managing a temperature of an onboard energy storage device (e.g. a battery) while a vehicle is traveling to a recharging station.

Depicted at FIG. 8 is a high-level methodology for detecting a proximity to an energy replenishment station and, in response to such detection, requesting confirmation from the vehicle operator as to whether the vehicle operator intends to stop at the energy replenishment station detected. If so, as discussed above, the controller may take action prior to the vehicle arriving at the energy replenishment station. The action taken may differ depending on whether the vehicle operator intends to refuel with liquid fuel, or recharge the onboard energy storage device. Accordingly, depicted at FIG. 9 is a method for taking such action when the intent is to refuel a fuel tank at the energy replenishment station. FIG. 10 continues from FIG. 9 and includes conducting a diagnostic to prevent the vehicle from driving away with a fuel filler nozzle mechanically coupled to the vehicle. The method of FIG. 10 is described with reference to the refueling assembly of FIG. 12. FIG. 11 depicts a method for taking action when the intent is to recharge an onboard energy storage device (e.g. a battery). FIG. 13 depicts an example timeline that illustrates how the methods of FIGS. 9-10 are conducted. FIG. 14 depicts an example timeline that illustrates how the method of FIG. 11 is conducted.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor (not shown at FIG. 1 but see FIG. 2). The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may include an output for communicating a message audibly to a vehicle operator, for example via a vehicle instrument panel speaker. The vehicle instrument panel 196 may also include various input portions for receiving an operator input, such as buttons, touch screens, voice input/recognition, etc. As one example, the vehicle instrument panel may include a microphone, for receiving voice input from a vehicle operator, and the controller may include voice recognition capability for inferring a meaning of the detected voice input. In some examples a smart voice assistant may be associated with the vehicle instrument panel, for communicating audible messages to the vehicle operator, and/or receiving audible input from the vehicle operator. For example, the smart assistant may include but is not limited to voice assistants such as Amazon Alexa, Google Assistant, Apple Siri, etc. Such examples are meant to be representative and are not meant to be limiting. As another example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on.

Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In some examples, vehicle system 100 may include navigation sensor(s) 133, which may include lasers, radar, sonar, acoustic sensors which may enable vehicle location, traffic information, learned driving routes, etc., to be collected via the vehicle.

Furthermore, an energy storage device heating/cooling system 151 may be included, for controlling a temperature of the energy storage device. As will be discussed in further detail below such a heating/cooling system 151 may be controlled as a function of a timing of a charging operation of the energy storage device.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system (evaporative emissions system) 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. In some examples, vehicle system 206 may be a hybrid electric vehicle system.

The engine system 208 may include an engine 110 having a plurality of cylinders 230. The engine 110 includes an engine air intake 223 and an engine exhaust 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. In some examples, an electric heater 298 may be coupled to the exhaust catalyst, and utilized to heat the exhaust catalyst to or beyond a predetermined temperature (e.g. light-off temperature). One or more emission control devices may include a three-way catalyst, lean NOx trap, diesel particulate filter, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

Fuel system 218 may include a fuel tank 220 coupled to a fuel pump system 221. It may be understood that fuel tank 220 may comprise the same fuel tank as fuel tank 144 depicted above at FIG. 1. In some examples, the fuel system may include a fuel tank temperature sensor 296 for measuring or inferring a fuel temperature. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system (referred to herein as evaporative emissions system) 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow the fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283.

Further, in some examples, recovery line 231 may be coupled to a fuel filler system 219. In some examples, fuel filler system may include a fuel cap 205 for sealing off the fuel filler system from the atmosphere. However, in some examples the fuel filler system 219 may not include fuel cap 205, where the fuel filler system 219 comprises a capless fuel filler system. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm. Such an example may pertain to a fuel filler system that does not include a fuel cap, for example.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a fuel tank pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222, as discussed. The fuel vapor canisters may be filled with an appropriate adsorbent 286b, such that the canisters are configured to temporarily trap fuel vapors (including vaporized hydrocarbons) during fuel tank refilling operations and during diagnostic routines, as will be discussed in detail below. In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and canister load may be estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. When included, the canister vent valve 297 may be a normally open valve. A fuel tank isolation valve (FTIV) 252 may in some examples be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. In some examples, purging may include additionally commanding open the FTIV, such that fuel vapors from the fuel tank may additionally be drawn into the engine for combustion. It may be understood that purging the canister further includes commanding or maintaining open CVV 297.

Thus, CVV 297 may function to adjust a flow of air and vapors between canister 222 and the atmosphere, and may be controlled during or prior to diagnostic routines. For example, the CVV may be opened during fuel vapor storing operations (for example, during fuel tank refueling) so that air, stripped of fuel vapor after having passed through the canister, can be pushed out to the atmosphere. Likewise, as mentioned above, during purging operations (for example, during canister regeneration and while the engine is running) the CVV may be opened to allow a flow of fresh air to strip the fuel vapors stored in the canister.

In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed may be reduced.

Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. Controller 212 may receive input data from the various sensors, process the input data, and trigger the actuators in response to the processed input data based on instruction or code programmed therein corresponding to one or more routines. Example control routines are described herein with regard to FIGS. 8-11.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors, or via expiration of a timer set such that when the timer expires the controller is returned to the awake mode. In some examples, the opening of a vehicle door may trigger a return to an awake mode. In other examples, the controller may need to be awake in order to conduct such methods. In such an example, the controller may stay awake for a duration referred to as a time period where the controller is maintained awake to perform extended shutdown functions, such that the controller may be awake to conduct evaporative emissions test diagnostic routines.

Undesired evaporative emissions detection routines may be intermittently performed by controller 212 on fuel system 218 and/or evaporative emissions system 251 to confirm that undesired evaporative emissions are not present in the fuel system and/or evaporative emissions system. One example test diagnostic for undesired evaporative emissions includes application of engine manifold vacuum on the fuel system and/or evaporative emissions system that is otherwise sealed from atmosphere, and in response to a threshold vacuum being reached, sealing the evaporative emissions system from the engine and monitoring pressure bleed-up in the evaporative emissions system to ascertain a presence or absence of undesired evaporative emissions In some examples, engine manifold vacuum may be applied to the fuel system and/or evaporative emissions system while the engine is combusting air and fuel. In other examples, the engine may be commanded to be rotated unfueled in a forward direction (e.g. the same direction the engine rotates when combusting air and fuel) to impart a vacuum on the fuel system and/or evaporative emissions system. In still other examples, a pump (not shown) positioned in vent line 227 may be relied upon for applying a vacuum on the fuel system and/or evaporative emissions system.

Controller 212 may further include wireless communication device 280, to enable wireless communication between the vehicle and other vehicles or infrastructures, via wireless network 131.

As discussed above, vehicle system 206 (e.g. same as 100) may be a hybrid vehicle with multiple sources of torque available to one or more vehicle wheels 292 (e.g. same as 130). In the example shown, vehicle system 206 may include an electric machine 293. Electric machine 293 may be a motor (e.g. 120) or a motor/generator (e.g. combination of 120 and 160). Crankshaft 294 of engine 210 and electric machine 293 are connected via a transmission 254 to vehicle wheels 292 when one or more clutches 272 are engaged. In the depicted example, a first clutch is provided between crankshaft 294 and electric machine 293, and a second clutch is provided between electric machine 293 and transmission 254. Controller 212 may send a signal to an actuator of each clutch 272 to engage or disengage the clutch, so as to connect or disconnect crankshaft 294 from electric machine 293 and the components connected thereto, and/or connect or disconnect electric machine 293 from transmission 254 and the components connected thereto. Transmission 254 may be a gearbox, a planetary gear system, or another type of transmission. The powertrain may be configured in various manners including as a parallel, a series, or a series-parallel hybrid vehicle.

Electric machine 293 receives electrical power from a traction battery 258 (e.g. same as 150) to provide torque to vehicle wheels 292. Electric machine 293 may also be operated as a generator to provide electrical power to charge traction battery 258, for example during a braking operation.

The above examples of FIGS. 1-2 depict a hybrid electric vehicle. However, it may be understood that the present disclosure is not limited to hybrid vehicles. The methods and systems discussed herein may be applicable in some examples to a vehicle powered by liquid fuel and where said vehicle does not include an electric machine. In other examples, the systems and methods discussed herein may be applicable to electric vehicles (referred to herein as battery electric vehicles, pure electric vehicles, all-electric vehicles), without departing from the scope of this disclosure.

Figure 3:
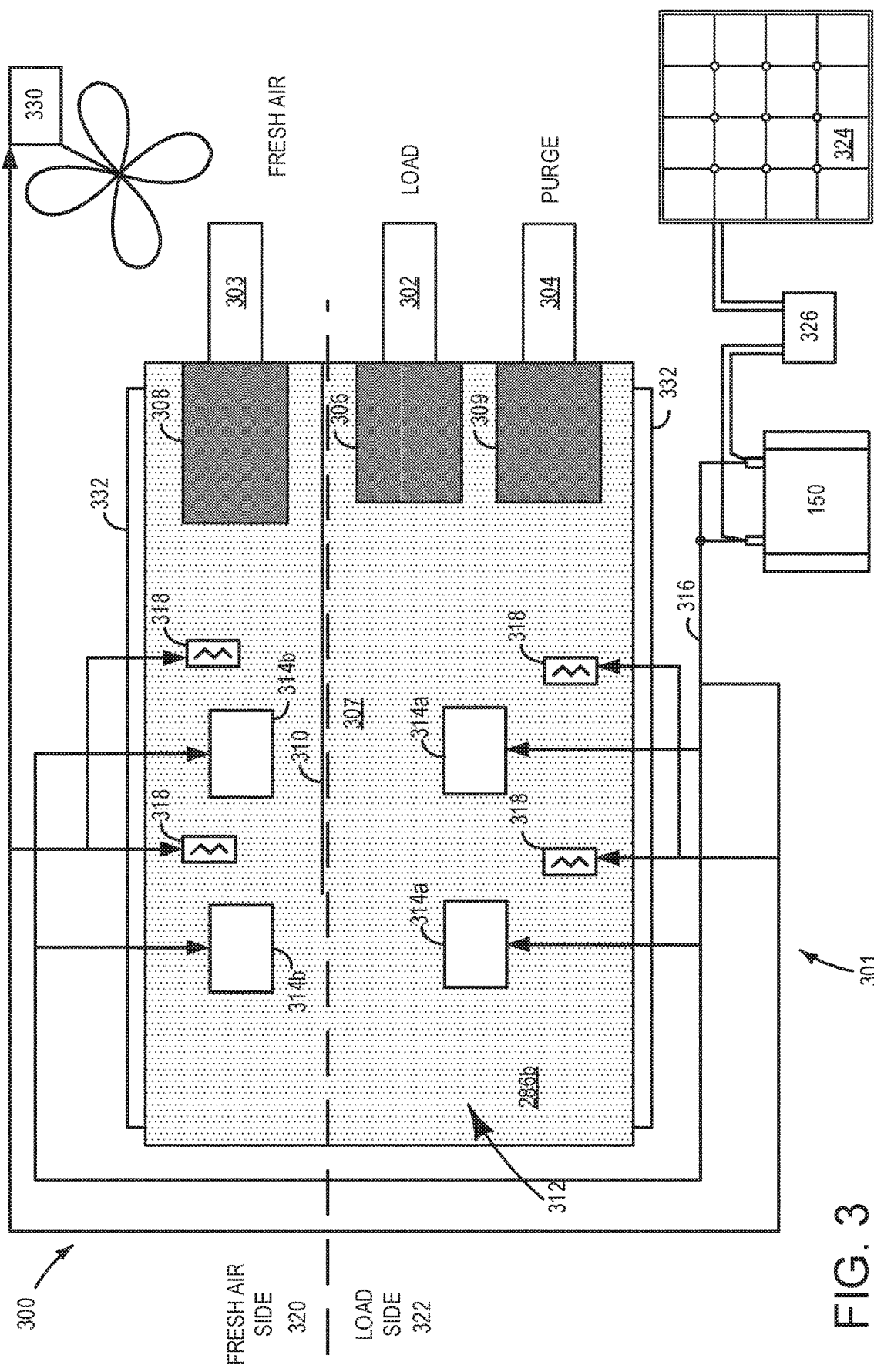
FIG. 3 shows a schematic depiction of a thermal management system for a fuel vapor canister.

FIG. 3 shows a detailed schematic diagram of an example fuel vapor canister 300 (e.g. same as canister 222). Canister 300 may comprise a load port 302 configured to couple the canister to a fuel tank via a conduit, such as conduit 278, as shown in FIG. 2. In some examples, load port 302 may be coupled to a canister buffer (not shown at FIG. 3), such as canister buffer 286a, as shown in FIG. 2. Canister 300 may further comprise a fresh air port 303 that may be coupled to atmosphere via a canister vent line, such as vent line 227, as show in FIG. 2. Canister 300 may further include a purge output port 304 that may be coupled to an engine intake via a purge line, such as purge line 228, as shown in FIG. 2. Load port 302 may facilitate the flow of fuel vapor into canister 300 via load conduit 306. Load conduit 306 may extend into central cavity 307 of canister 300. Similarly, canister fresh air port 303 may be configured to couple the fresh air side of the fuel vapor canister to atmosphere via a canister vent line, and thus may facilitate the flow of fresh air into, and gasses stripped of fuel vapor out of canister 300 via fresh air conduit 308. Fresh air conduit 308 may extend into central cavity 307 of canister 300. Purge conduit 309 may extend into central cavity 307 and may facilitate the flow of fuel vapor out of canister 300 and into purge output port 304. In some examples, a partition 310 may extend between fresh air conduit 308 and conduits 306 and 309 to facilitate distribution of fuel vapor and fresh air throughout central cavity 307. Accordingly, canister 300 may be considered divided into a fresh air side 320 and a load side 322 though partition 310 may not completely isolate fresh air side 320 of canister 300 from load side 322. As such, load port 302 and purge output port 304 may be coupled to load side 322, while fresh air port 303 may be coupled to fresh air side 320.

Canister 300 may be filled with an adsorbent material 312 (e.g. same as adsorbent material 286b). Central cavity 307 and adsorbent material 312 may thus comprise an adsorbent bed. The adsorbent bed may be partitioned into a load side and a fresh air side by partition 310. Adsorbent material 312 may comprise any suitable material for temporarily trapping fuel vapors (including vaporized hydrocarbons) generated during fuel tank refueling operations, as well as diurnal vapors. In one example, adsorbent material 312 is activated charcoal. Fuel vapor entering central cavity 307 via load conduit 306 may bind to adsorbent material, while gasses stripped of fuel vapor may then exit canister 300 via fresh air conduit 308. Conversely, during a purge operation, fresh air may enter central cavity 307 via fresh air conduit 308, while desorbed fuel vapor may then exit canister 300 via purge conduit 309.

During canister loading, such as during a refueling event, fuel vapor adsorbing to the adsorbent material 312 is an exothermic reaction. In particular, the adsorbent material in the region of central cavity 307 that surrounds load conduit 306 will experience an increased temperature during a majority of canister loading events. Similarly, during canister purging, fuel vapor desorbing from the adsorbent material 286b is an endothermic reaction. In particular, the adsorbent material in the region of central cavity 307 that surrounds purge conduit 309 will experience a decreased temperature during a majority of canister purging events.

Canister 300 may be coupled to a canister temperature management system 301. Canister temperature management system 301 may include one or more heating and one or more cooling mechanisms. For example, canister temperature management system 301 may include one or more thermo-electric devices. In this example, Peltier elements (314a and 314b) are coupled within central cavity 307, and may be operable to selectively heat or cool the canister adsorbent bed. Each Peltier element has two sides. For clarity, only the side internal to the canister is shown in FIG. 3. When DC current flows through a Peltier element, it brings heat from a first side to a second, opposite side. In a first conformation, heat may be drawn from the side on the interior of the canister towards the exterior side, releasing heat at heat sink 332, thus cooling the interior of the canister. Alternatively, if the charge polarity of the Peltier element is reversed, the thermoelectric generator may operate in the other direction, drawing heat from the exterior of the canister, thus warming the interior of the canister. DC current 316 may be provided by a rechargeable battery or onboard energy storage device 150. Onboard energy storage device 150 may be supplied voltage and/or current by charge controller 326, which may be configured to receive power from the solar cells 324. In other words, one or more solar cells may be configured to provide power to the one or more Peltier elements. In some examples, charge controller 326 may be used to directly supply power to external devices, such as Peltier elements 314a and 314b. In examples that do not include solar cells 324, onboard energy storage device 150 may be charged via the generator (e.g. 160).

Peltier elements 314a are shown positioned within canister 300 on canister load side 322, while Peltier elements 314b are shown positioned in canister 300 on the fresh air side 320. As such, Peltier elements 314a and 314b may be differentially regulated. For example, in a first condition Peltier elements 314a may be activated, while Peltier elements 314b remain off, and, in a second condition, Peltier elements 314a and 314b may both be activated. In most scenarios, all active Peltier elements will be activated with the same polarity (e.g., all elements heating or cooling the interior of the canister). However, in some scenarios one or more Peltier elements may act to cool the surrounding region of the canister, while one or more Peltier elements may act to heat the surrounding region of the canister. While two Peltier elements are shown within each of load side 322 and fresh air side 320, more or fewer elements may be included on each side, and the elements may be distributed unevenly throughout central cavity 307. In other words, one or more cooling elements may be coupled within the adsorbent bed on the load side of the fuel vapor canister, and one or more cooling elements may be coupled within the adsorbent bed on the fresh air side of the fuel vapor canister.

Canister temperature management system 301 may additionally include one or more cooling fans 330, configured to direct air towards the fuel vapor canister 300, under conditions wherein the Peltier elements 314a and 314b are operating in cooling mode. In such a conformation, heat is generated external to the canister, and may be dissipated by directing air towards the canister via cooling fan 330. Power to the cooling fan 330 may be provided by rechargeable battery 150. In some examples, power to the cooling fan 330 may be provided directly via charge controller 326. In some examples, a cooling circuit may additionally or alternatively be coupled to the exterior of the canister. For example, a portion of an engine coolant circuit (not shown) may flow coolant across the exterior of the canister thus dissipating heat generated while cooling the canister interior with Peltier elements 314a and 314b.

Canister temperature management system 301 may additionally include one or more temperature sensors 318, positioned within central cavity 307 of canister 300. Temperature sensors 318 (e.g. same as temperature sensor 232) may be thermistors, for example. Accordingly, the temperature of the adsorbent material 312 may be indicated by temperature sensors 318. Power to the temperature sensors 318 may be provided by the rechargeable battery (e.g. battery 150). In some examples power to the temperature sensors may be provided directly via charge controller 326.

A controller, such as controller 212 in FIG. 2, may be configured to receive and process signals from components of the canister temperature management system 301, such as temperature sensors 318. The controller may additionally trigger the actuator components of canister management system 301, for example the Peltier elements 314a and 314b as well as cooling fan 330, in response to processed signals based on instruction or code programmed therein corresponding to one or more routines, such as the routines described further herein.

Figure 4:
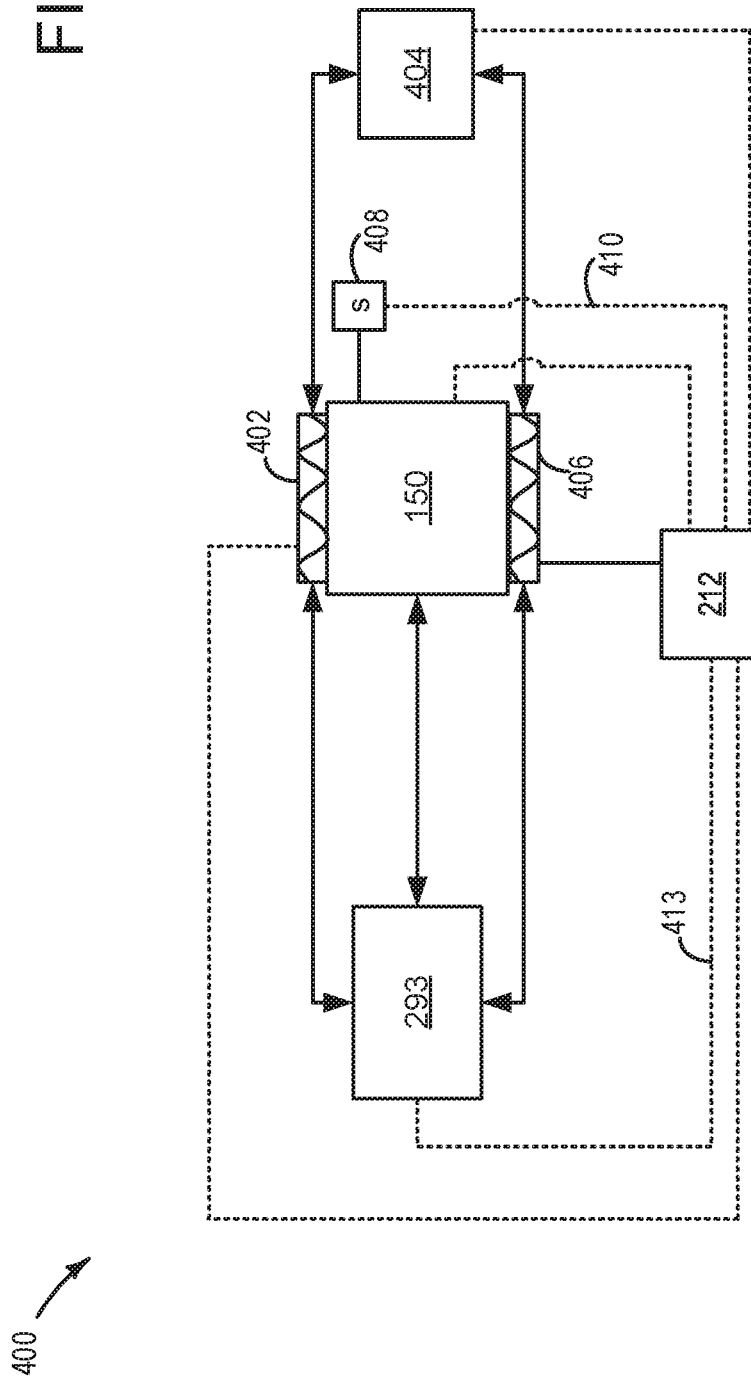
FIG. 4 depicts a first example of a temperature management system for an onboard energy storage device, such as a battery.

Referring to FIG. 4, a schematic diagram of a first embodiment of an exemplary heating and cooling system 400 (e.g. same as 151) of a battery (e.g. energy storage device 150) in a hybrid electric vehicle (e.g. 100) is illustrated. The heating and cooling system 400 may also be referred to as an electrically powered battery temperature conditioning system. The heating portion of the system 400 (which may be referred to solely as an electrically powered heating system) may include an electric heater 402 that is configured to transfer heat to the battery 150 (e.g. same as 258). The electric heater 402 may be any type of electric heater including heaters having resistance heating elements, immersion heaters, and positive temperature coefficient (PTC) heaters. The electric heater 402 may receive power via electrical wiring from battery 150, an accessory battery 404 (such as a 12 V battery commonly found in automobiles), an alternator (not shown), the M/G 293, or any other power source that may be included in the HEV 100. The electric heater 402 may be configured to accept AC and/or DC electrical power. An AC to DC converter may be included if the electric heater 402 is configured to operate only on DC electrical power and the power source (e.g., alternator or M/G 293) is configured to generate AC electrical power. A DC to AC converter may be included if the electric heater 402 is configured to operate only on AC electrical power and the power source (e.g., battery) is configured to generate DC electrical power.

The cooling portion of the system 400 (which may be referred to solely as an electrically powered cooling system) may include a thermoelectric cooler 406. The thermoelectric cooler 406 may receive power via electrical wiring from the battery 150, the accessory battery 404, the alternator, the M/G 293, or any other power source that may be included in the HEV 100. The thermoelectric cooler 406 may be configured to accept AC and/or DC electrical power. An AC to DC converter may be included if the thermoelectric cooler 406 is configured to operate only on DC electrical power and the power source is configured to generate AC electrical power. A DC to AC converter may be included if the thermoelectric cooler 406 is configured to operate only on AC electrical power and the power source is configured to generate DC electrical power.

The controller 212 may also be in communication with the battery 150, accessory battery 404, M/G 293, alternator, or any other power source that may be utilized to power the electric heater 402 or thermoelectric cooler 406. The controller 212 may coordinate which power source will be utilized to power the electric heater 402 or the thermoelectric cooler 406. For example, the battery 150 may be used to power the electric heater 402 or thermoelectric cooler 406 if the battery 150 is sufficiently charged, the accessory battery 404 may be used to power the electric heater 402 or thermoelectric cooler 406 if the accessory battery 404 is sufficiently charged, the M/G 293 may be used to power the electric heater 402 or thermoelectric cooler 406 if the M/G 293 is operating as a generator, or the alternator may be used to power the electric heater 402 or thermoelectric cooler 406.

The controller 212 may also be in communication with a series of sensors that are configured to communicate to the controller 212 certain conditions of the HEV 100 or the surrounding environment. A temperature sensor 408 may be configured to communicate the temperature of the battery 150 to the controller 212. The ability of a battery to receive charge (including the rate at which the battery may receive charge and the total amount of charge the battery may receive) may increase when the battery temperature is within an optimal or desired temperature range. The optimal temperature range may be between 20° F. and 120° F. A more concentrated optimal temperature range may be 50° F. and 100° F. A still more concentrated optimal temperature range may be between 68° F. and 72° F. An optimal recharge temperature may allow for a highest state of current flow to the battery. In order to maintain battery temperature in a desired range for recharging, the controller 212 may act as a vehicle battery temperature controller and may be configured to activate the electric heater 402 or the thermoelectric cooler 406 to adjust the temperature of the battery 150 so that it is within a desired temperature range for receiving charge. The controller 212 may include an input channel 410 configured to receive a signal from the temperature sensor 408 indicative of the temperature of the battery 150. If the temperature of the battery 150 is lower than a lower energy storage device temperature threshold, the controller 212 may activate the electric heater 402 to increase the temperature of the battery 150. The lower energy storage device temperature threshold may correspond to a lower limit of the desired temperature range. If the temperature of the battery 150 is greater than an upper energy storage device temperature threshold, the controller 150 may activate the thermoelectric cooler 406 to decrease the temperature of the battery 150. The upper energy storage device temperature threshold may correspond to an upper limit of the desired temperature range. The lower and upper temperature thresholds may also be referred to as first and second thresholds.

In some examples, the controller 212 may be programmed to, by providing a command via an output channel 413, direct the M/G 293 to direct current generated during regenerative braking to either the electrically powered heating system or electrically powered cooling system (which may be collectively referred to as the heating and cooling system 400 or the electrically powered battery temperature conditioning system) in order to heat or cool the battery 150. The controller 212 may include control logic and algorithms that are programmed into the controller 212. The control logic and algorithms may determine when to direct the current during regenerative braking to either the electrically powered heating system or electrically powered cooling system in order heat or cool the battery 150. The controller may include instructions to generate a command based on the control logic and algorithms to direct at least a portion of the current generated by regenerative braking to the electrically powered cooling system (in this case the current would be directed to the thermoelectric cooler 406) in response to the temperature of the battery being greater than the upper energy storage device temperature threshold. The controller may further include instructions to generate a command, based on the control logic and algorithms, to direct at least a portion of the current generated by regenerative braking to the electrically powered heating system (in this case the current would be directed to the electric heater 402) in response to the temperature of the battery being less than the lower energy storage device temperature threshold. The current that is directed form the M/G 293 during regenerative braking to the either the electrically powered cooling system or the electrically powered heating system may be a portion of the total regenerative braking power that exceeds a charging rate limit of the battery 150.

By utilizing the otherwise wasted regenerative braking energy to heat or cool the battery to a desired temperature range, the need to operate temperature controls during periods where there is no excess regenerative braking energy may be greatly reduced, avoiding the need to use energy that is not "free" for that purpose. Furthermore, by using the excess regenerative braking energy to condition the battery to accept additional charge, as opposed to using friction braking alone, wasteful use of the engine 110 for compression braking solely for the purpose of dissipating excess energy may be avoided or reduced.

Figure 5:
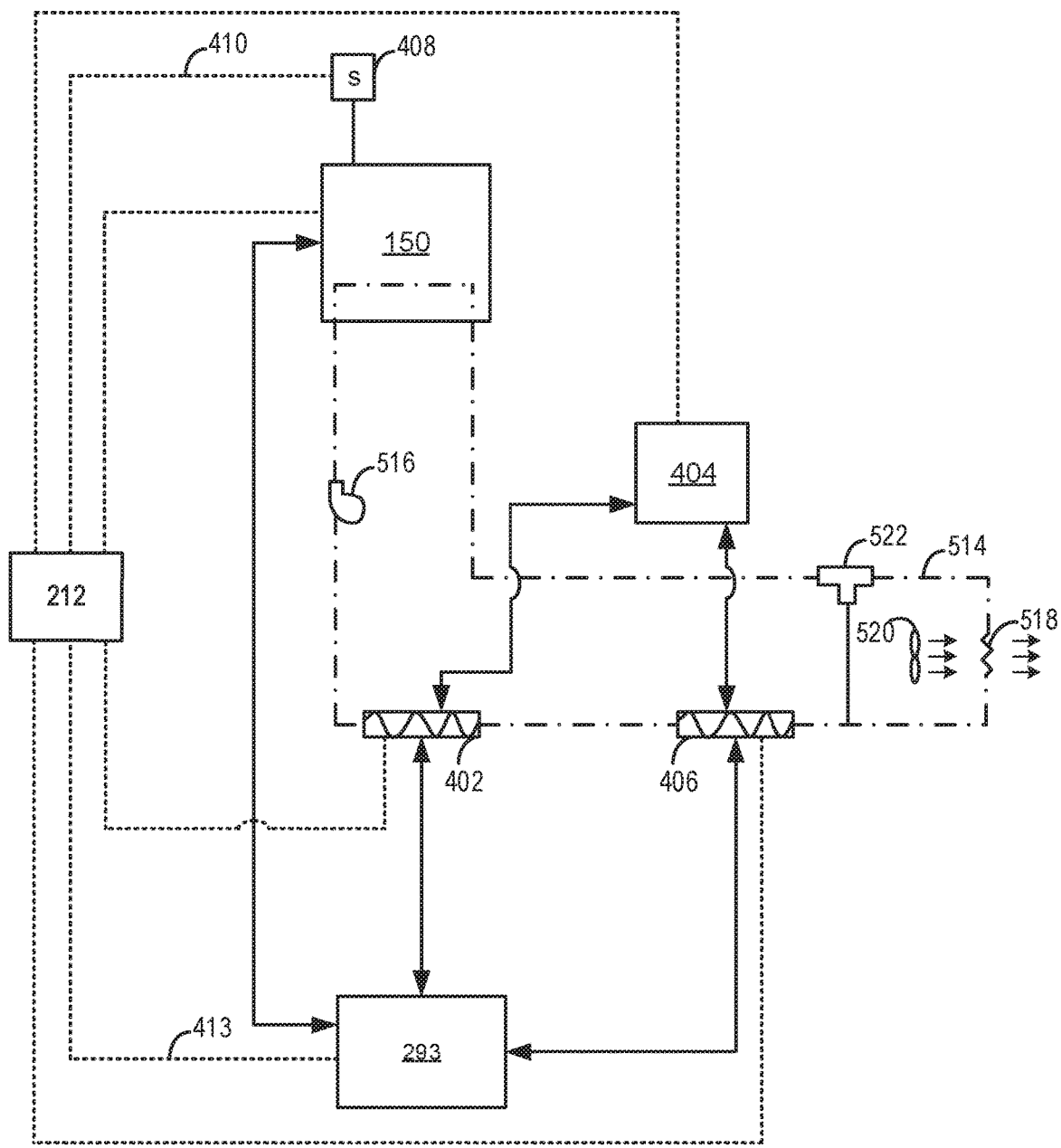
FIG. 5 depicts a second example of a temperature management system for an onboard energy storage device, such as a battery.

Referring to FIG. 5, a schematic diagram of a second example of an exemplary heating and cooling system 500 (e.g. same as 151) of a battery (e.g. 150) in a hybrid electric vehicle (e.g. 100) is illustrated. The second example of the heating and cooling system 500 also includes the M/G 293, battery 150, controller 212, electric heater 402, accessory battery 404, thermoelectric cooler 406, temperature sensor 408, input channel 410, and output channel 413.

The second embodiment 500 includes a coolant loop 514 that is in fluid communication with the battery 150. The coolant loop 514 may be an independent system or part of another cooling system, such as an engine cooling system. The coolant loop 514 includes a coolant loop pump 516 that is configured to cycle a coolant through the coolant loop 514. The coolant loop 514 may also include a heat exchanger 518 that is configured to remove heat from the coolant that is within the coolant loop 514. A fan 520 may be used to direct air across the heat exchanger 518 in order to remove excess heat from the coolant within the coolant loop 514. The coolant loop 514 may also include a valve or thermostat 522 that may be used to bypass the heat exchanger 518 when it is not desirable to remove excess heat from the coolant. The electric heater 402 and the thermoelectric cooler 406 may be configured to receive current generated by the M/G 293 during regenerative braking to heat or cool the coolant within the coolant loop 514 in order to maintain the desired temperature range of the battery 150. The controller 212 may maintain the desired temperature range of the battery 150 by controlling the electric heater 402 and the thermoelectric cooler 406 to heat or cool the coolant within the coolant loop in the same manner that the electric heater 402 and thermoelectric cooler 406 are controlled in the first embodiment of the heating and cooling system (see FIG. 4) to maintain the desired temperature range of the battery 150.

The second embodiment of the heating and cooling system 500 functions in the same manner as the first embodiment of the heating and cooling system 400 except for the differences described above. All of the components of the second embodiment of the heating and cooling system 500 that are common with the first embodiment of the heating and cooling system 400 should be construed to function in the same manners as described with regard to the first embodiment of the heating and cooling system 400.

Figure 6:
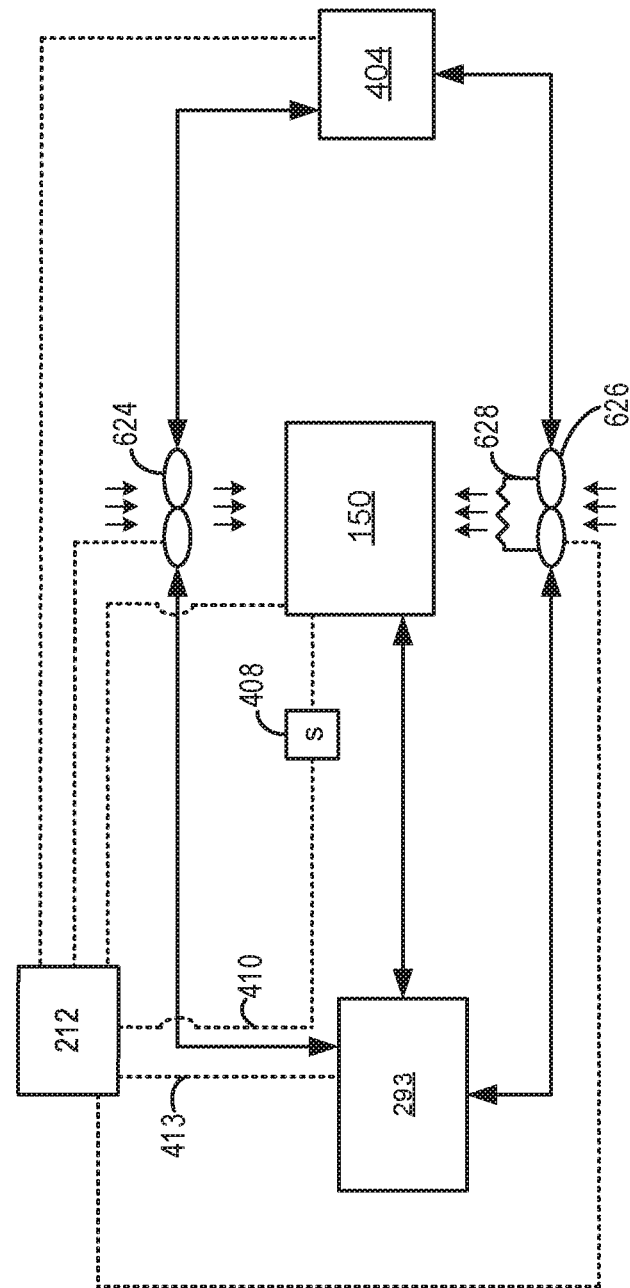
FIG. 6 depicts a third example of a temperature management system for an onboard energy storage device, such as a battery.

Referring to FIG. 6, a schematic diagram of a third example of an exemplary heating and cooling system 600 of a battery (e.g. 150) in a hybrid electric vehicle (e.g. 100) is illustrated. The third example of the heating and cooling system 600 also includes the M/G 293, battery 150, controller 212, accessory battery 404, temperature sensor 408, input channel 110, and output channel 413.

The third embodiment 600 does not include the electric heater 402 or thermoelectric cooler 406, but however includes at least one fan to either heat or cool the battery 150 by directing air across the battery 150. In the described third example, a first fan 624 is used to direct air across the battery 150 in order to cool the battery 150. The air directed by the first fan 624 may be the ambient air or the air from the vehicle cabin if the air is at a temperature sufficient enough to cool the battery 150. For example, if the first fan 624 is directing cabin air across battery 150, the cabin air may have been cooled by an air-conditioning system (not shown) of the HEV 100. However, in another alternative example, the first fan 624 may be used to direct cabin air across battery 150 in a situation where temperature of the battery is desired to be raised, and cabin air has been heated by a heating system (not shown), for example. A second fan 626 may operate in conjunction with a resistive coil 628 in order to direct heated air across the battery 150 in order to heat the battery 150. The air directed by the second fan 626 may be the ambient air or the air from the vehicle cabin. The first fan 624, second fan 626, and resistive coil 628 may be configured to receive current generated by the M/G 293 during regenerative braking to heat or cool the battery 150 in order to maintain the desired temperature range of the battery 150. The controller 212 may maintain the optimal or desired temperature range of the battery 150 by controlling the first fan 624, second fan 626, and resistive coil 628 in the same manner that the electric heater 402 and thermoelectric cooler 406 are controlled in the first example of the heating and cooling system 400 to maintain the desired temperature range of the battery 150.

The third example of the heating and cooling system 600 functions in the same manner as the first embodiment of the heating and cooling system 400 except for the differences described above. All of the components of the third embodiment of the heating and cooling system 600 that are common with the first embodiment of the heating and cooling system 400 should be construed to function in the same manners as described with regard to the first embodiment of the heating and cooling system 100.

Figure 7:
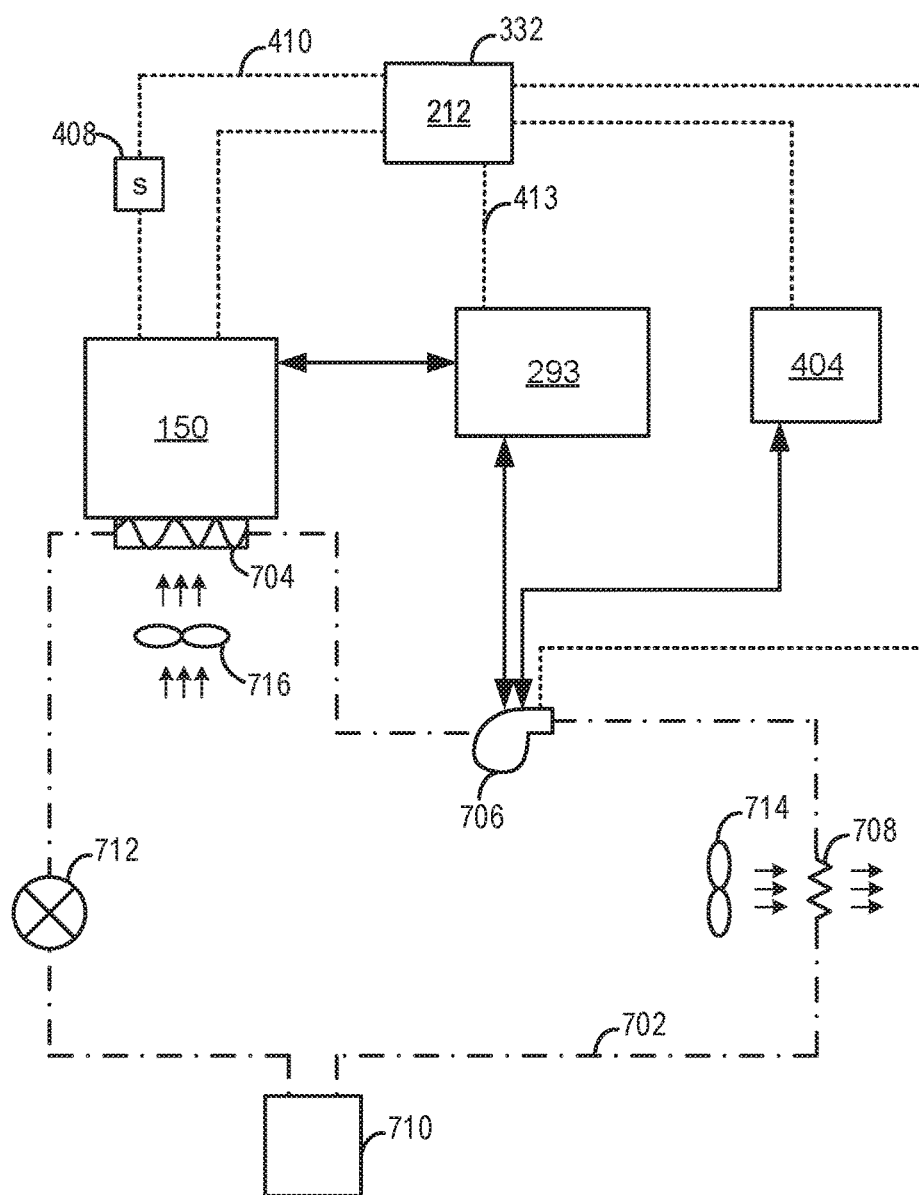
FIG. 7 depicts a fourth example of a temperature management system for an onboard energy storage device, such as a battery.

Referring to FIG. 7, a fourth example of an exemplary cooling system 700 of a battery in a hybrid electric vehicle is illustrated. The fourth example of the cooling system 700 also includes the M/G 293, battery 150, controller 212, accessory battery 404, temperature sensor 408, input channel 410, and output channel 413.

The fourth embodiment of the cooling system 700 differs from the other embodiments in that a refrigerant loop 702 is used cool the battery 150. The refrigerant loop 702 includes an evaporator 704 that is configured to cool the battery 150, a compressor 706 that is configured to cycle a refrigerant through the refrigerant loop 702, a condenser 708 that is configured to reject heat from the refrigerant loop 702 to the ambient surroundings, a receiver/dryer 710, and a thermal expansion valve 712. A third fan 714 may be used to direct air across the condenser 708 in order to reject heat from the refrigerant loop 702 to the ambient surroundings. A fourth fan 716 may be used to direct air across the evaporator 704 in order to cool the air. The cooled air may be then directed across the battery 150 in order to cool the battery 150. Alternatively, the evaporator 704 may directly contact the battery 150 in order to cool the battery 150. In yet another alternative, a cold plate or a series of thermally conductive fins may connect the evaporator 704 to the battery 150 in order to cool the battery 150. The compressor 706 may be configured to receive current generated by the M/G 293 during regenerative braking to operate the refrigerant loop 702 in order to cool the battery 150 such that the battery is within the desired temperature range. The controller 212 may maintain the desired temperature range of the battery 150 by controlling the compressor 706 in order to operate the refrigerant loop 702 in the same manner that the thermoelectric cooler 706 is controlled in the first example of the heating and cooling system 100 to maintain the desired temperature range of battery 150.

The fourth example of the cooling system 700 functions in the same manner as the cooling system in the first example of the heating and cooling system 100 except for the differences described above. All of the components of the fourth example of the cooling system 700 that are common with the first example of the heating and cooling system 100 should be construed to function in the same manners as described with regard to the first embodiment of the heating and cooling system 100.

While the above examples depict a number of systems for heating/cooling an onboard energy storage device (e.g. 150), it may be understood that other examples are within the scope of this disclosure. As one example, tab cooling in which a water-based coolant or an organic refrigerant is circulated through a cold plate system built into a battery pack of the onboard energy storage device via a pump may be utilized without departing from the scope of this disclosure. In such an example the coolant may be used to remove heat from the pack and may also be used to provide heating of the pack for fast charging at low temperatures.

Turning now to FIG. 8, a high-level example method 800 for determining whether conditions are met for preparing an energy receiving apparatus of a vehicle for accepting an increase in energy level is shown. Specifically, method 800 may include determining whether the vehicle is within a particular proximity to an energy replenishment station, and if so, requesting confirmation from the vehicle operator for taking action to prepare the energy receiving apparatus for accepting the increase in energy level. In this way, such action to prepare the energy receiving apparatus for accepting the increase in energy level is not taken under situations where the increase in energy level is not desired. Controlling the vehicle in such a manner may conserve energy, increase lifetime of particular vehicle componentry, and/or reduce a release of undesired evaporative emissions to atmosphere.

Method 800 will be described with reference to the systems described herein and shown in FIGS. 1-7, though it should be understood that similar methods may be applied to other systems without departing from the scope of this disclosure. Method 800 may be carried out by a controller, such as controller 212 in FIG. 2, and may be stored at the controller as executable instructions in non-transitory memory. Instructions for carrying out method 800 and the rest of the methods included herein may be executed by the controller based on instructions stored on a memory of the controller and in conjunction with signals received from sensors of the engine system, such as the sensors described above with reference to FIGS. 1-7. The controller may employ actuators such as FTIV (e.g. 252), CVV (e.g. 297), coolant loop pump (e.g. 516), fan (e.g. 520), electric heater (e.g. 402), thermoelectric cooler (e.g. 406), first fan (e.g. 624), second fan (e.g. 626), motor/generator (e.g. 293), resistive coil (e.g. 628), third fan (e.g. 714), fourth fan (e.g. 716), compressor (e.g. 706), etc., to alter states of devices in the physical world according to the methods depicted below.

Method 800 begins at 805, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, level of storage of the onboard energy storage device (e.g. 150), temperature of the onboard energy storage device, etc., as well as various ambient conditions, such as ambient temperature, humidity, barometric pressure, etc.

Proceeding to 810, method 800 includes indicating whether the vehicle is within a predetermined proximity to an energy replenishment station. Discussed herein, the energy replenishment station may comprise a fuel filling station (e.g. gas station) or a recharging station for increasing a charge of an onboard energy storage device (e.g. 150) such as a battery. In some examples, such an energy replenishment station may comprise both a fuel filling station and a recharging station.

Proximity to such an energy replenishment station may be communicated to the vehicle controller in some examples via the onboard navigation system (e.g. 132). Additionally or alternatively, proximity to such an energy replenishment station may be communicated to the vehicle controller by way of V2V and/or V2I communications. Additionally or alternatively, proximity to such an energy replenishment station may be communicated to the vehicle controller via wireless communication with the internet. In still other examples, the vehicle controller may store learned driving routes, where such learned driving routes are learned over time based on information retrieved from appropriate sensor systems of the vehicle (e.g. onboard navigation system 132, navigational sensors 133, etc.). Such a learned route may in some examples include information cross-referenced with the internet and/or onboard navigation system to infer proximity to an energy replenishment station.

The predetermined proximity may in some examples comprise a predetermined distance from the energy replenishment station. For example, the predetermined distance may comprise 1 mile or less, 2 miles or less, etc. It may be understood that in some examples, the predetermined distance is based on a shortest route to the energy replenishment station in terms of driven distance, as opposed to, for example, distance by air. However, in other examples an air distance may be used to determine proximity to the energy replenishment station.

In some examples, the predetermined proximity may be fixed, however in other examples the predetermined proximity may be adjustable depending on particular vehicle operating parameters. Specifically, in one example the predetermined proximity may be adjusted based on a determined level of energy storage at the energy receiving apparatus. For example, where the energy receiving apparatus comprises a fuel tank, the predetermined proximity may be a function of a fuel fill level in the fuel tank. For example, the predetermined proximity may be increased as fuel fill level decreases, and may be decreased as fuel fill level increases. In another example where the energy receiving apparatus comprises an onboard energy storage device (e.g. 150), such as a battery, the predetermined proximity may be a function of a level of storage of the energy storage device. Similar to that discussed for the fuel tank, in situations where the energy replenishment apparatus comprises the onboard energy storage device, as a charge level decreases the predetermined proximity may be increased and as the charge level increases the predetermined proximity may be decreased.

If, at 810, it is indicated that proximity to such an energy replenishment station is not detected via the controller, method 800 may proceed to 815. At 815, method 800 includes maintaining current vehicle operating conditions. Specifically, at 815, method 800 includes not taking particular actions to prepare for accepting an increase in energy level at the energy replenishment apparatus. For example, where the energy replenishment apparatus comprises the fuel tank, a current position of the FTIV (e.g. 252) may be maintained. In another example where the energy replenishment apparatus comprise the fuel tank, heating/cooling elements (e.g. 314a, 314b) associated with the canister may be maintained in their current status. In an example where the energy replenishment apparatus comprises the onboard energy storage device (e.g. 150), componentry for heating and/or cooling the onboard energy storage device (refer to FIGS. 4-7) may be maintained in their current respective status. Method 800 may then continue to monitor for proximity to an energy replenishment station, as discussed above.

If, at 810, proximity to an energy replenishment station is detected at the controller, method 800 may proceed to 820. At 820, method 800 may include indicating whether conditions are met for requesting confirmation to prepare the energy receiving apparatus for accepting an increase in energy level. In examples where the energy receiving apparatus comprises the fuel tank, conditions being met may include a fuel fill level below a predetermined threshold fuel fill level. Conditions being met may additionally or alternatively include a fuel tank pressure greater than a predetermined threshold fuel tank pressure. Conditions being met may additionally or alternatively include a loading state of the fuel vapor storage canister being greater than a threshold canister loading state. Conditions being met may additionally or alternatively include an ambient temperature greater than a predetermined threshold ambient temperature. Conditions being met may additionally or alternatively include a prior indication that the vehicle operator intends to refuel the fuel tank during the current drive cycle. For example, while not explicitly illustrated, in some examples the vehicle controller may communicate to the vehicle operator a question as to whether the vehicle operator is planning to refuel the fuel tank during the current drive cycle. Such a question may be presented to the vehicle operator in the form of a text-based message, an audible message, etc. For example, such a question may be communicated to the vehicle operator via the vehicle instrument panel (e.g. 196). If the vehicle operator provides confirmation (e.g. audibly, via a touch screen, via a particular button associated with the instrument panel, etc.) of the intent to refuel during the current drive cycle, then conditions may met at 820 for requesting confirmation to prepare for accepting an increase in energy at the fuel tank.

In some examples where the energy receiving apparatus comprises the fuel tank, conditions being met may be based on several of the above-mentioned factors considered together. For example, the controller may store an algorithm that takes into account proximity to a refueling station, fuel level in the fuel tank, predicted length of a current trip (input into the onboard navigation system or from learned driving routines), and a probability of refueling (which may be based at least in part on fuel level, number of fuel stations along the predicted/inferred driving route, etc.). Output from the algorithm may be used to determine whether conditions are met for requesting confirmation from the vehicle operator. For example, if output from the algorithm is above a threshold output, then the request may be triggered.

In another example where the energy receiving apparatus comprises the onboard energy storage device (e.g. 150), conditions being met at 820 may in some examples comprise a level of energy storage below an energy storage device level threshold (ESD level threshold). Conditions being met at 820 may additionally or alternatively include an indication of a temperature of the onboard energy storage device outside of a predetermined energy storage device temperature range. It may be understood that the predetermined energy storage device temperature range may comprise a range for which accepting an increase in energy storage is most efficient (e.g. in terms of timeframe for increasing the level of energy storage, for example). Conditions being met at 820 may additionally or alternatively be based on ambient temperature. For example, if ambient temperature is above an upper ambient temperature threshold, conditions may be met at 820. In another example, if ambient temperature is below a lower ambient temperature threshold, conditions may be met at 820. Additionally or alternatively, similar to that discussed above where the energy receiving apparatus comprises the fuel tank, conditions being met at 820 may include an indication that the vehicle operator intends to recharge the onboard energy storage device (e.g. 150) during the current drive cycle. In other words, conditions being met at 820 may be additionally or alternatively based on a probability that the vehicle operator intends to recharge the onboard energy storage device during the current drive cycle. Such a probability may be based on distance until a final destination based on learned driving routines or information input into the navigation system. In some examples, as discussed above, such an probability may be based on information received at the controller in response to a question being posed via the controller as to whether the vehicle operator intends to recharge the onboard energy storage device at some point during the current drive cycle.

If, at 820, it is indicated that conditions are not met for requesting confirmation to prepare the energy receiving device for accepting an increase in energy storage level, method 800 may proceed to 815 where, as discussed above, current vehicle operating conditions are maintained. Alternatively, at 820, in response to conditions being indicated to be met, method 800 may proceed to 825. At 825, method 800 may include requesting confirmation from the vehicle operator to take action to prepare the energy receiving apparatus for accepting the increase in energy storage level.

Briefly, where the energy receiving apparatus comprises the fuel tank, it may be understood that in order to refuel the fuel tank, the fuel tank must first be depressurized before a refueling lock (e.g. 245) opens (e.g. either opens based on a pressure difference between fuel tank pressure and atmospheric pressure, or is commanded open based on a signal from the controller) to allow fuel to be delivered to the tank. In a case where pressure in the fuel tank is high, such a depressurization may take some time, which may be undesirable from the standpoint of a vehicle operator if the depressurization is initiated when the vehicle stops at a refueling station. Furthermore, such a depressurization may further load the fuel vapor canister with fuel vapors, which may lead to release of undesired evaporative emissions in some examples. Thus, it is herein recognized that upon detecting proximity to a refueling station, action may be taken to reduce a time frame for allowing refueling to commence once the vehicle stops at the refueling station. Further action may be taken to reduce a potential for release of undesired evaporative emissions to environment and/or to improve a capability of the canister to adsorb refueling vapors during the refueling of the fuel tank. For example, fuel tank depressurization may be preemptively initiated prior to the vehicle stopping at the refueling station (e.g. while the vehicle is driving to the refueling station), so that the fuel tank is depressurized (e.g. fuel tank pressure below a predetermined threshold fuel tank pressure) when the vehicle arrives at the refueling station, thus reducing the timeframe for allowing the fuel tank to receive fuel. In another example, a temperature of the canister may be controlled/regulated such that a potential for release of undesired evaporative emissions to atmosphere is reduced or avoided, in terms of the fuel tank depressurization which may load the canister with fuel vapors, and in terms of the refueling operation which may too further load the canister with fuel vapors.

However, it is also herein recognized that such action may be undesirable if the vehicle operator does not actually intend to refuel the fuel tank at the particular refueling station that has been detected. For example, if a fuel tank depressurization is initiated but the vehicle operator does not intend to refuel the vehicle at the particular detected refueling station, then the canister may be further loaded with fuel vapors which may lead to potential for release of undesired evaporative emissions to atmosphere. In another example, controlling temperature of the canister at a time when refueling is not intended may undesirably consume energy and may thus decrease fuel economy.

Said another way, if upon detecting a proximity to a refueling station, such actions as those described above were automatically initiated, there may be circumstances where such actions are undertaken when a refueling operation is not desired or intended. There may be a number of such situations that occur during a particular drive cycle where proximity to a refueling station is detected, and if such actions were to be taken each time the proximity were detected, then undesirable issues (e.g. reduction in fuel economy, wear and tear on components such as the FTIV, canister, etc.) related to taking such actions, as discussed above, may be compounded. Accordingly, it is herein recognized that when proximity to such a refueling station is detected, it may be desirable to confirm with the vehicle operator as to whether the vehicle operator intends to refuel the fuel tank at the refueling station detected, or not. If the answer received from the vehicle operator is no, then the controller may avoid taking unnecessary action to prepare for receiving fuel at the fuel tank.

While the above example pertained to a situation where the energy receiving apparatus comprised the fuel tank, similar logic applies to situations where the energy receiving apparatus comprises the onboard energy storage device (e.g. 150). Briefly, where the energy receiving apparatus comprises the onboard energy storage device, it may be desirable to control a temperature of the onboard energy storage device to be within the predetermined energy storage device temperature range as discussed above. However, such controlling of the temperature may rely on onboard energy, and thus if such action is taken when the vehicle operator does not intend to recharge the onboard energy storage device, then such energy may be wasted. Similar to that discussed above where the energy receiving device comprises the fuel tank, in situations where the energy receiving device comprises the onboard energy storage device, there may be a number of recharging stations detected along a particular driving route the vehicle is traveling. If action to control temperature of the onboard energy storage device were to be taken each time proximity to a recharging station were detected, then such action may undesirably consume excess energy as compared to a situation where such action were taken only when it was confirmed that a recharging operation is desired.

Accordingly, at 825, method 800 may include requesting confirmation from the vehicle operator as to whether the vehicle operator plans to stop at the energy replenishment station detected at step 810. In one example, the request may comprise an audible message communicated to the vehicle operator via the instrument panel. As an example, the audible message may include a query in the form of a sentence that includes information pertaining to a location of the energy replenishment station. In some examples, the audible message may additionally or alternatively include a query as to whether the vehicle operator intends to stop at a replenishment station within a predetermined timeframe. In other examples, requesting confirmation from the vehicle operator may include similar information and may be in the form of a text-based message at a touch screen of the instrument panel. In some examples, both an audible message and a text-based message may be communicated to the vehicle operator. In still other examples, via the touch screen and/or onboard navigation system, a map may be communicated to the vehicle operator indicating where the particular energy replenishment station detected is located, such that the vehicle operator can readily ascertain whether that particular energy replenishment station is a station where the vehicle operator intends to stop.

It may be further understood that the request at 825 may include information related to whether the operator intends to increase an energy level of the fuel tank or the onboard energy storage device. For example, in a case where the energy replenishment station comprises a refueling station for dispensing liquid fuel to vehicle fuel tanks, and not for recharging onboard energy storage devices, then the intention may be understood to comprise an intent to refuel the fuel tank. Alternatively, if the energy replenishment station comprises a station for recharging onboard energy storage devices, and not for refueling fuel tanks with liquid fuel, then the intention may be understood to comprise an intent to recharge the onboard energy storage device. However, in a case where the energy replenishment station includes capability for both refueling a fuel tank with liquid fuel and for recharging onboard energy storage devices, then the request at 825 may include additional information as to whether the intent is to refuel the fuel tank, or to recharge the onboard energy storage device.

Upon issuing such a request for confirmation from the vehicle operator, method 800 may proceed to 830. At 830, method 800 may include indicating whether the request is confirmed, or not. For example, confirming the request may include the vehicle operator communicating an audible reply (e.g. speaking) that can be received via, for example, the microphone at the vehicle instrument panel, and where voice recognition capability interprets the audible reply. The audible reply may in some examples comprise a "yes" response if the vehicle operator intends to stop at the particular energy replenishment station. Alternatively, the audible reply may in other examples comprise a "no" response if the vehicle operator does not intend to stop at the particular energy replenishment station. In other additional or alternative examples, the vehicle operator may depress a button associated with the instrument panel for confirming the response. In still other additional or alternative examples, the request may be confirmed or denied via the vehicle operator inputting such information via the touch screen associated with the vehicle instrument panel. For example, via the instrument panel touch screen, the vehicle operator may touch a "yes" button to confirm the intent to stop at the particular energy replenishment station, or may touch a "no" button to indicate that it is not currently intended to stop a the particular energy replenishment station. In a case where no response is provided, it may be understood that the request is not confirmed. Furthermore, as discussed above, in some examples a request being confirmed by include additional information pertaining to whether the intent is to refuel the fuel tank or to recharge the onboard energy storage device. Such additional information may be communicated in similar fashion as that discussed above for confirming the request.

Accordingly, if in response to initiating the request for confirmation at 825, the request is not confirmed at 830, or in other words, it is communicated to the controller via the vehicle operator that the vehicle operator does not intend to stop at the particular energy replenishment station, method 800 may proceed to 835. At 835, method 800 may include postponing preparing for accepting the energy level increase. Said another way, the controller may prevent any action from being taken to prepare for the vehicle stopping at the particular detected energy replenishment station, since the vehicle operator does not intend to stop at the particular detected energy replenishment station.

Proceeding to 840, method 800 may include scheduling a future confirmation request for querying as to whether the vehicle operator intends to stop at a particular detected energy replenishment station. In one example, scheduling such a future confirmation request may simply comprise communicating such a query when another energy replenishment station is detected within the predetermined proximity during the current drive cycle. In another example where a drive route is known to the controller, either via communication with the onboard navigation system for which a route has been input via the vehicle operator or based on a learned driving routine, a future confirmation request may be scheduled when the vehicle reaches a particular location along the current drive cycle. Method 800 may then end. However, it may be understood that along the current driving route the controller may continue to assess proximity to energy replenishment stations as discussed above.

Returning to 830, in response to the request being confirmed, or in other words, in response to the vehicle operator confirming the intention to stop at the energy replenishment station detected, method 800 may proceed to 845. At 845, method 800 may include proceeding to FIG. 9 where method 900 may be used to take action to prepare for accepting the increase in energy level as discussed above.

Accordingly, turning now to FIG. 9, method 900 is depicted. It may be understood that method 900 continues from method 800, and thus method 900 is described with reference to the systems described herein and shown in FIGS. 1-7, though it may be understood that similar methods may be applied to other systems without departing from the scope of this disclosure. As method 900 continues from method 800, method 900 may be carried out by a controller, such as controller 212 depicted at FIG. 2, and may be stored at the controller as executable instructions in non-transitory memory. Instructions for carrying out method 900 and the rest of the methods included herein may be executed by the controller based on instructions stored on a memory of the controller and in conjunction with signals received from sensors of the engine system, such as the sensors described above with reference to FIGS. 1-7. The controller may employ actuators such as FTIV (e.g. 252), CVV (e.g. 297), coolant loop pump (e.g. 516), fan (e.g. 520), electric heater (e.g. 402), thermoelectric cooler (e.g. 406), first fan (e.g. 624), second fan (e.g. 626), motor/generator (e.g. 293), resistive coil (e.g. 628), third fan (e.g. 714), fourth fan (e.g. 716), compressor (e.g. 706), etc., to alter states of devices in the physical world according to the methods depicted below.

Method 900 begins at 905, and includes indicating whether the energy receiving apparatus comprises a fuel tank, or not. For example, if the energy replenishment station comprises a refueling station that dispenses liquid fuel to fuel tanks of vehicles, then it may be ascertained by the controller that the energy receiving apparatus comprises a fuel tank. In other examples, similar to that discussed above, a message may be communicated to the vehicle operator requesting information as to whether the intent is to refuel the fuel tank or to recharge the onboard energy storage device. If, at 905, it is determined that the energy receiving apparatus does not comprise the fuel tank, then method 900 may proceed to FIG. 11, where method 1100 may be conducted as will be discussed in further detail below. Alternatively, if at 905 it is determined that the energy receiving apparatus comprises the fuel tank, then method 900 may proceed to 910. It may be understood that because the energy receiving apparatus comprises the fuel tank, the energy replenishment station comprises a refueling station (e.g. gas station), and thus method 900 will be described in reference to a refueling station.

At 910, method 900 may include estimating a duration until the vehicle is expected to stop at the refueling station. Estimating the duration may involve determining, via the onboard navigation system, a distance (e.g. in miles, yards, feet, etc.), to the refueling station as inferred from the current path that the vehicle is traveling. It may be understood that in response to a deviation from the inferred path, then the estimated duration may be recalculated. In some examples, estimating the duration may additionally or alternatively include sending a request related to current traffic information via V2V and/or V2I communication, and receiving the information related to the request at the controller of the vehicle. Based on the information retrieved, the estimated duration may be determined. The estimated duration may be further based on speed limits inferred, for example via the onboard navigation system, current vehicle speed and/or expected vehicle speed while traveling to the refueling station. It may be understood, as will be discussed in further detail below, that the estimated duration may allow for controlling an aggressiveness of how temperature control of the canister is conducted and/or an aggressiveness of how fuel tank depressurization is conducted.

Accordingly, proceeding to 915, method 900 may include indicating whether temperature regulation of the canister is requested by the controller. Specifically, if canister temperature is above a canister temperature threshold, then it may be understood that canister temperature regulation may be requested. The canister temperature threshold may comprise a temperature threshold where, if above the threshold, adsorption of fuel vapors to the canister may be of a lower efficiency than when canister temperature is below the canister temperature threshold. In some examples, canister temperature regulation may additionally or alternatively be requested under circumstances where ambient temperature is greater than a predetermined ambient temperature threshold. In some examples, canister temperature regulation may additionally or alternatively be requested under circumstances where canister loading state is greater than a predetermined threshold canister load.

If, at 915, canister temperature regulation is requested, method 900 may proceed to 920. At 920, method 900 may include taking action to control canister temperature to a desired canister temperature, as a function of the estimated duration. For example, a rate at which canister temperature is controlled to the desired temperature may be dependent on the estimated duration, where the longer the estimate duration the slower the rate, and where the shorter the estimated duration the faster the rate. Furthermore, the rate may be a function of how far from the desired temperature canister temperature currently is. It may be understood that in some examples temperature regulation of the canister may be via heating/cooling elements (e.g. 314a, 314b) positioned within the canister. Additionally or alternatively, canister temperature regulation may be controlled via a cooling fan (e.g. 330) directed at the canister. In some examples, determining whether to utilize the cooling fan vs. the heating/cooling elements may be a function of a level of energy storage at the onboard energy storage device. For example, it may take less power to cool the canister via use of the cooling fan than the heating/cooling elements, and thus in a situation where energy storage at the onboard energy storage device is below a particular energy storage threshold, the cooling fan may be preferred over the heating/cooling elements. Power for operating the heating/cooling elements and/or cooling fan may be provided via the onboard energy storage device, which may receive energy via a source external to the vehicle (e.g. 180), via solar cells (e.g. 324), via energy recovered from regenerative braking, etc. In terms of canister temperature regulation, it may be understood that it may be desirable to control canister temperature such that the desired canister temperature level is attained at a substantially similar time (e.g. within 30 seconds or less, or within 1 minute or less) as the vehicle stops at the refueling station. If the temperature were achieved prior to arriving at the refueling station, then excess energy may have to be used to keep the canister at the desired temperature until the vehicle stops at the refueling station. Alternatively, if the desired temperature of the canister is not reached by the time the vehicle stops, then there may be an additional time for continuing to regulate canister temperature to the desired temperature prior to commencing refueling. By timing the canister temperature to reach the desired temperature at a time substantially similar to when the vehicle stops at the refueling station, such issues may be avoided.

Whether canister cooling is requested or not, method 900 may proceed to 925. At 925, method 900 includes depressurizing the fuel tank as a function of the estimated duration. Similar to that discussed above for canister temperature management, it may be understood that it may be desirable for fuel tank pressure to drop below the predetermined threshold fuel tank pressure at a substantially similar time (e.g. within 30 seconds or less, within 1 minute or less, etc.) as a time when the vehicle stops at the refueling station. If the pressure were relieved to below the predetermined threshold fuel tank pressure prior to the vehicle stopping, then additional fuel vapors may be undesirably contributed to canister loading. Alternatively, if the pressure were to remain above the predetermined threshold fuel tank pressure at a time when the vehicle stops at the refueling station, then there may be an undesirable additional amount of time to wait for the fuel tank to depressurize. By timing the depressurization to coincide with the vehicle stopping at the refueling station, such issues may be avoided.

For depressurizing the fuel tank in order to have the fuel tank become depressurized to below the predetermined threshold fuel tank pressure at a substantially similar time as when the vehicle stops at the refueling station, a duty cycle of the FTIV may be controlled as a function of the fuel tank pressure and the estimated duration until the vehicle stops. For example, the duty cycle of the FTIV may be increased as the estimated duration decreases and as fuel tank pressure increases. Alternatively, the duty cycle of the FTIV may be decreased as the estimated duration increases and as fuel tank pressure decreases. It may be understood that the duty cycle of the FTIV as the vehicle proceeds to the refueling station may not be fixed, but may change as a function of estimated duration and fuel tank pressure. In other words, the vehicle controller may continually update the estimated duration and may continually monitor fuel tank pressure as the vehicle is traveling to the refueling station, such that the FTIV duty cycle may be controlled in order to time the depressurization so that the fuel tank pressure drops below the predetermined threshold fuel tank pressure at a time substantially similar to the time when the vehicle stops at the refueling station.

Furthermore, while not explicitly illustrated, it may be understood that for depressurizing the fuel tank, while the FTIV is being duty cycled, the CVV may be commanded open, and the CPV may be commanded closed. In this way, fuel tank vapors stemming from the fuel tank may be directed to the canister for adsorption. Furthermore, once refueling is initiated, as will be discussed below, it may be understood that the FTIV and the CVV may be maintained open.

Proceeding to 930, method 900 may include indicating whether the vehicle is indicated to have stopped at the refueling station. If not, then method 900 may return to 915, where canister temperature regulation may continue (where requested), and fuel tank depressurization may continue.

Alternatively, in response to an indication that the vehicle has stopped at the refueling station, method 900 may proceed to 935. At 935, method 900 may include unlocking the refueling lock. While not explicitly illustrated, in a case where the refueling lock is unlocked based on a pressure gradient in the fuel tank compared to atmospheric pressure, when the fuel tank pressure drops below the predetermined fuel tank pressure threshold, the refueling lock may automatically unlock. However, in other examples where the refueling lock is electronically actuated, the controller may command the refueling lock unlocked in response to the vehicle stopping and the pressure in the fuel tank dropping below the predetermined threshold fuel tank pressure.

In this way, it may be understood that the fuel tank may be ready to be refueled at a time coinciding with the vehicle stopping at the refueling station. Such action may increase customer satisfaction, as opposed to situations where the fuel tank depressurization routine is initiated when the vehicle stops at a refueling station. Customer satisfaction may be improved as wait times to commence refueling may be reduced via the methodology discussed herein. Furthermore, by controlling canister temperature to a desired temperature while the vehicle is en route to the refueling station, the canister may be at the desired temperature at the time when the vehicle stops at the refueling station, which may improve adsorption efficiency and thereby reduce opportunity for release of undesired evaporative emissions to the environment in response to the refueling.

With the refueling lock unlocked at 935, method 900 may proceed to 940, where fuel level in the fuel tank may be monitored during the refueling operation. In other words, after the refueling lock is unlocked, refueling may commence via insertion of a refueling nozzle or dispenser into a fuel filler neck coupled to the fuel tank, and fuel fill level may be monitored while the fuel tank is being refueled. It may be understood that in order to monitor fuel fill level during the refueling event, the controller may be kept awake.

Proceeding to 945, method 900 may include indicating as to whether the refueling event has stopped. For example, the refueling may be indicated to be stopped when fuel level in the fuel tank plateaus for a predetermined amount of time (e.g. 30 seconds or more, 15 seconds or more, etc.). If, at 945, it is indicated that the refueling of the fuel tank has not stopped, method 900 may return to 940, where method 900 may continue to monitor fuel fill level during the refueling operation. Alternatively, in response to the refueling being indicated to be stopped at 945, method 900 may proceed to 950. At 950, method 900 may include proceeding to FIG. 10 in order to conduct a fuel nozzle removal diagnostic. It may be understood that the fuel nozzle removal diagnostic relies on a pressure build in the fuel system, and accordingly, it may be understood that in order for conditions to be met for conducting the fuel nozzle removal diagnostic, an entry condition may include the fuel system and evaporative emissions system being free from sources of undesired evaporative emissions.

Accordingly, continuing to FIG. 10, method 1000 is depicted. It may be understood that method 1000 continues from method 900, and thus method 1000 is described with reference to the relevant systems described herein, though it may be understood that similar methods may be applied to other systems without departing from the scope of this disclosure. As method 1000 continues from method 900, method 1000 may be carried out by a controller, such as controller 212 depicted at FIG. 2, and may be stored at the controlled as executable instructions in non-transitory memory. Instructions for carrying out method 1000 and the rest of the methods included herein may be executed by the controller based on instructions stored on a memory of the controller and in conjunction with signals received from sensors of the engine system, such as the sensors described above. The controller may employ actuators such as FTIV (e.g. 252), CVV (e.g. 297), etc., to alter states of devices in the physical world according to the methods depicted below.

It may be understood that method 1000 includes conducting a pressure-based test diagnostic for inferring whether the refueling nozzle has been removed from the fuel filler neck subsequent to the refueling event, or not. Such a method may be particularly useful for vehicles that participate in car-sharing models, where different vehicle operators operate the vehicle at different times and where such different vehicle operators may not be used to refueling such a particular fuel tank, etc. In other words, errors with regard to nozzle removal may be more frequently encountered for vehicles that are a part of a car-sharing model, and thus to avoid undesired issues related to the vehicle being driven while the nozzle remains in the fuel filler neck, method 1000 may be conducted post-refueling events.

Accordingly, subsequent to the indication that refueling has stopped, and (while not explicitly illustrated), when fuel tank pressure decays to atmospheric pressure, method 1000 may include commanding closed the CVV to seal the fuel tank from atmosphere. While the methodology discussed relates to commanding closed the CVV, it may be understood that in other examples the FTIV may be commanded closed to seal the fuel tank, instead of commanding closed the CVV.

With the CVV commanded closed, method 1000 may include monitoring fuel tank pressure. Pressure may be monitored via the FTPT (e.g. 291), for example. Pressure may be monitored for a predetermined time period, for example for 30 seconds, for 1 minute, for 2 minutes, for 3 minutes, etc.

Continuing to 1015, method 1000 includes indicating whether the pressure build is greater than a pressure build threshold. Specifically, it may be understood that when the refueling nozzle is inserted into the fuel filler neck, there may be a pathway from the fuel tank to atmosphere created via the refueling nozzle being inserted. Accordingly, if pressure in the fuel tank does not build to a level greater than the pressure build threshold, then it may be inferred that the refueling nozzle remains in the fuel filler neck. Alternatively, if the pressure in the fuel tank builds to greater than the pressure build threshold, then it may be inferred that the nozzle has been removed, whereupon the pathway from the fuel tank to atmosphere otherwise created via the refueling nozzle being inserted into the fuel filler neck, no longer exists.

Figure 12:
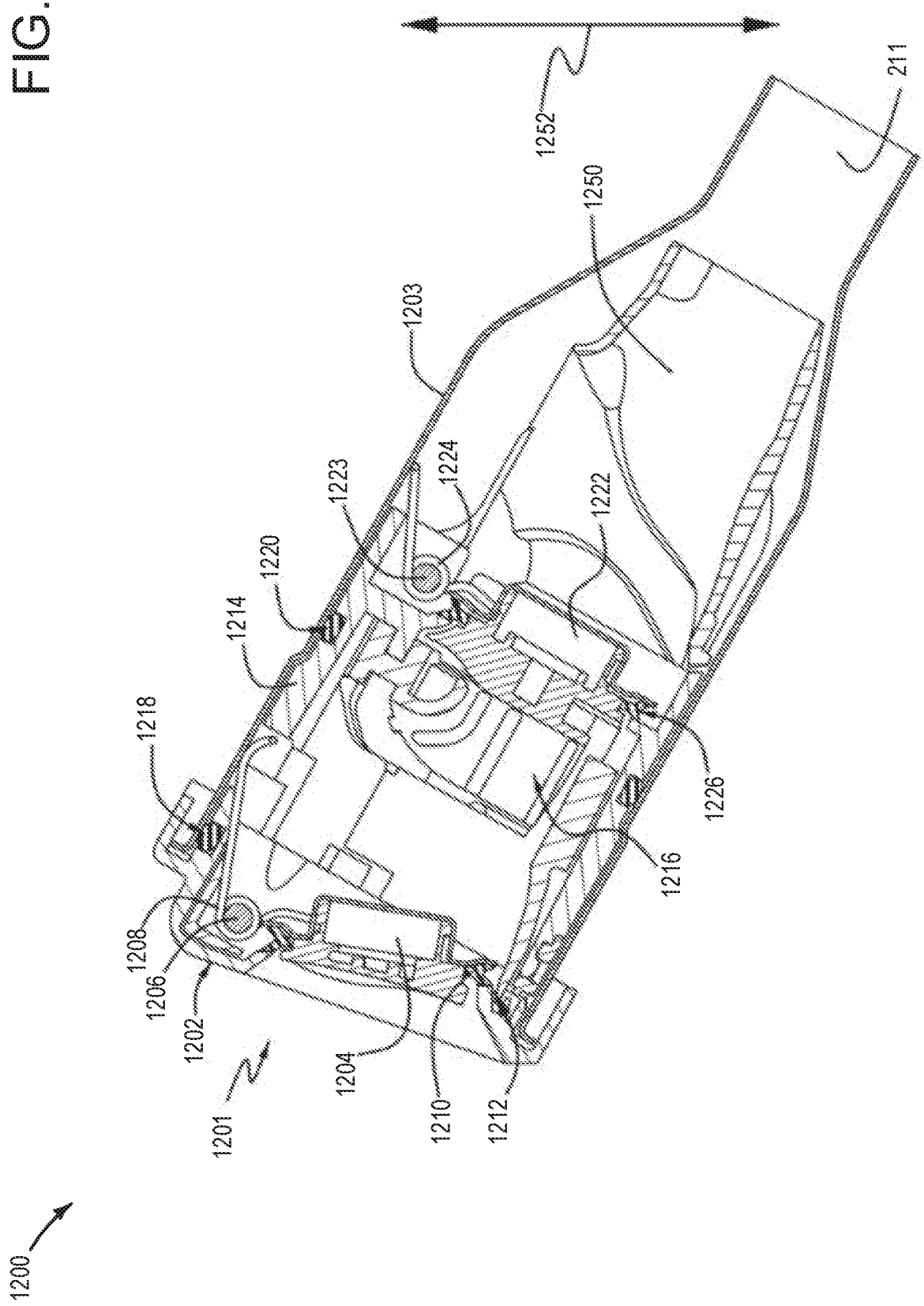
FIG. 12 depicts an example of a refueling assembly of the present disclosure.
Figure 13:
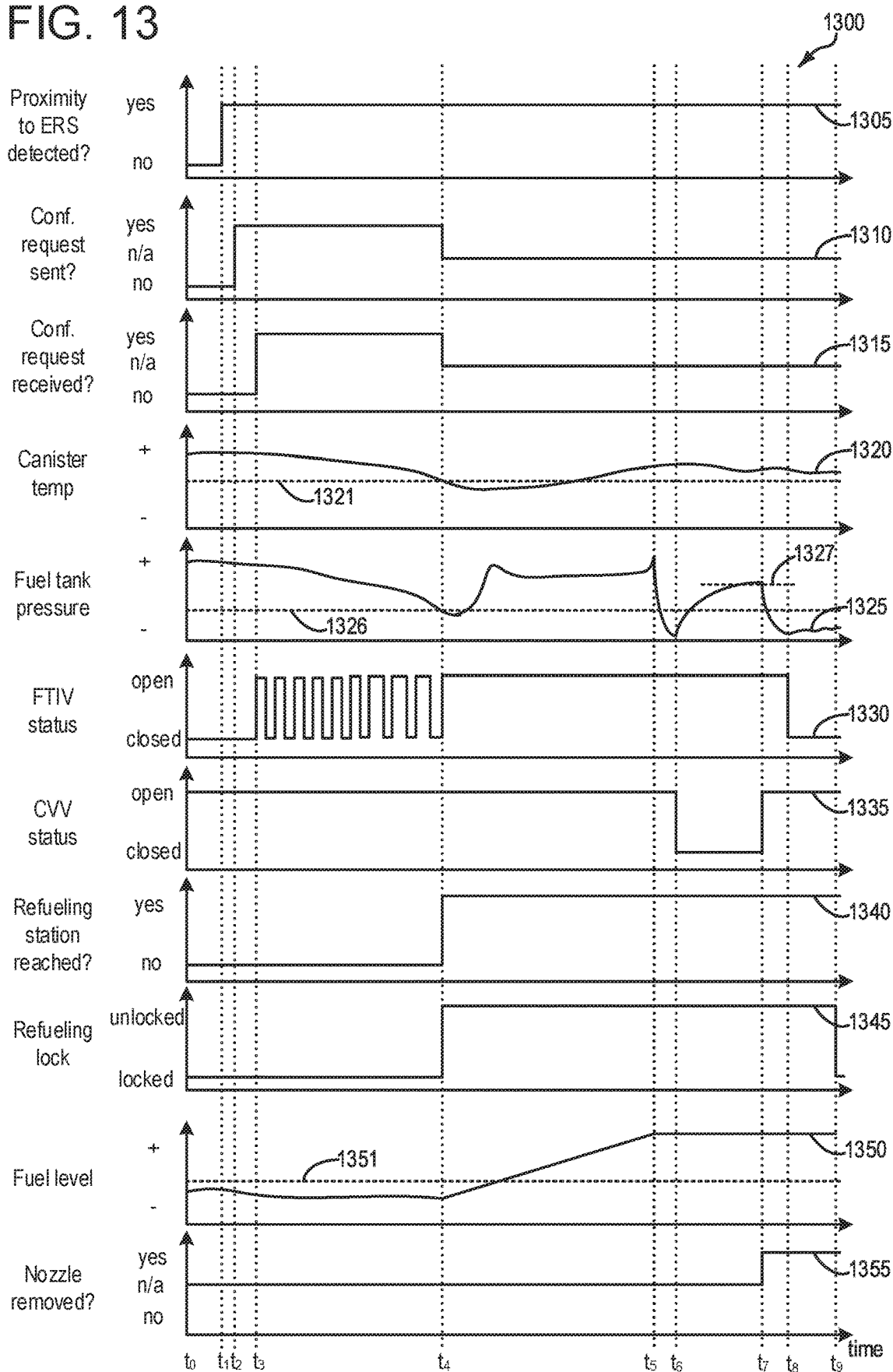
FIG. 13 depicts an example timeline for managing a temperature of a fuel vapor canister and/or depressurizing a fuel tank while a vehicle is traveling to a refueling station.

More specifically, turning to FIG. 12, an example illustration 1200 depicts refueling assembly 1201, which may be included in fuel filler system 219 depicted at FIG. 2. The refueling assembly 1201 includes a cover 1202. The cover 1202 is configured to enclose components in the assembly. The refueling assembly further includes an external housing 1203 configured to at least partially enclose various internal components of the refueling assembly 1201. The refueling assembly 108 further includes an upstream door 1204 having a hinge 1206. The upstream door 1204 is inset from the cover 1202. A preloaded upstream spring 1208 may be coupled to the upstream door 1204 and the external housing 1203. The preloaded upstream spring 1208 coupled to the upstream door 1204 providing a return force to the door when opened. The upstream spring 1208 is configured to provide a return force when the upstream door 1204 is depressed via a fuel nozzle. In this way, the upstream door 1204 may close after a fuel nozzle is removed during a refueling event. Thus, the upstream door 1204 automatically closes without assistance from a refueling operator.

A seal 1210 may be attached to the upstream door 1204. Specifically, the seal 1210 may extend around the periphery of the upstream door 1204, in some examples. When the upstream door 1204 is in a closed position the seal may be in face sharing contact with the cover 1202.

The refueling assembly 1201 further includes a locking lip 1212. The locking lip 1212 may be configured to receive a portion of a fuel nozzle. In some examples, the locking lip 1212 may be provided around at least 100° of the inside circumference of the refueling assembly 1201. The locking lip 1212 may influence the positioning and angle of the fuel nozzle axis spout during refueling and therefore has an impact on filling performance.

The refueling assembly 1201 further includes an internal housing 1214. The walls of the internal housing 1214 may define a nozzle enclosure configured to receive a fuel nozzle. The internal housing 1214 may also include a nozzle stop actuator 1216 configured to actuate a portion of the fuel nozzle that initiate fuel flow from the fuel nozzle.

An upstream body seal 1218 and a downstream body seal 1220 may be provided in the refueling assembly 1201 to seal the external housing 1203 and various internal components in the refueling assembly 1201. Specifically, the upstream and downstream body seals are configured to extend between the external housing 1203 and the internal housing 1214. The upstream body seal 1218 and/or downstream body seal 1220 may be an O-ring in some examples.

The refueling assembly 1201 further includes a downstream door 1222 positioned downstream of the upstream door 1204 and the nozzle stop actuator 1216. The downstream door 1222 includes a hinge 1223 and has a preloaded downstream spring 1224 coupled thereto. The preloaded downstream spring 1224 is coupled to the downstream door 1222 providing a return force to the downstream door 1222 when opened The downstream spring 1224 is also coupled to the external housing 1203. The spring 1224 is configured to provide a return force to the downstream door 1222 when the downstream door 1222 is in an open position. The downstream door 1222 may also include a seal 1226 (e.g., flap seal). The seal 1226 may be positioned around the periphery of the downstream door 1222, in some examples. The downstream door 1222 is arranged perpendicular to the fuel flow when closed, in the depicted example. However, other orientations of the downstream door 1222 are possible.

In one example, refueling assembly 1201 has a downward gradient. In other words, upstream door 1204 is positioned vertically above flow guide 1250 with regard to gravitational axis 1252. In this way, fuel flow is assisted via gravity during refueling operation.

Refueling assembly 1201 includes flow guide 1250 which is arranged downstream of downstream door 1222. Refueling assembly 1201 further includes filler neck 211. Flow guide 1250 may be at least partially enclosed by filler neck 211. Filler neck 211 is in fluidic communication with fuel tank 220 as shown in FIG. 2.

Thus, with reference to FIG. 12, it may be understood that when refueling nozzle is inserted into refueling assembly 1201, there may be a leak pathway (not specifically illustrated but which is created via the nozzle opening both the upstream door 1204 and downstream door 1222) which enables fluidic communication between the fuel tank and atmosphere. However, when the nozzle is removed, both the upstream door 1204 and downstream door 1222 close, thus sealing the fuel tank from atmosphere.

Accordingly, returning to FIG. 10, because the addition of fuel to the fuel tank during refueling generates fuel vapors, when the fuel tank is sealed via the commanding closed of the CVV, and with the nozzle removed to seal the fuel tank from atmosphere by way of the fuel filler neck, then a pressure build greater than the pressure build threshold may be expected. Alternatively, if the nozzle remains inserted, then due to the communication between the fuel tank and atmosphere, a pressure build greater than the pressure build threshold may not be expected.

Thus, at 1015, if the pressure build in the fuel tank is greater than the pressure build threshold, then method 1000 may proceed to 1020. At 1020, method 1000 may include indicating that the fuel nozzle has been removed. In such an example, no further action may be taken, and method 1000 may proceed to 1025, where vehicle operating parameters are updated at the controller. Specifically, current fuel level may be updated to reflect the recent refueling event. Furthermore, updating vehicle operating parameters at 1025 may include commanding open the CVV, and commanding closed the FTIV. Method 1000 may then end.

Alternatively, returning to 1015, in response to the pressure build not being greater than the pressure build threshold, method 1000 may proceed to 1030. At 1030, method 1000 may include indicating whether conditions are met for alerting the vehicle operator that the fuel dispenser nozzle remains attached to the vehicle (e.g. remains inserted in the fuel filler neck). Conditions being met at 1030 may include an indication that the vehicle is occupied by the vehicle operator, for example via seat load cells (not shown), and/or that the vehicle operator door has opened indicating the vehicle operator is returning to the vehicle. In another example, conditions being met at 1030 may include an indication of an engine start, indicating that the vehicle operator is preparing to drive away from the refueling station.

If conditions are not yet met for alerting the vehicle operator that the nozzle remains in the filler neck, method 1000 may continue to monitor for when conditions are met for doing so. Alternatively, in response to conditions being indicated to be met at 1030, method 1000 may proceed to 1035. At 1035, method 1000 may include providing the alert to the vehicle operator, and requesting confirmation that mitigating action has been taken to remove the nozzle from the filler neck. Specifically, similar to that discussed above, the alert may take the form of an audible alert (which may or may not include language in the form of a sentence), text-based alert (e.g. via a touch-screen associated with the vehicle instrument panel), etc. However the alert is issued, it may be understood that the alert may include a request that the vehicle operator confirm when mitigating action has been undertaken to remove the nozzle from the filler neck. The confirmation may be provided audibly, which may be received via the microphone associated with the vehicle instrument panel and interpreted via the controller, may be input via the touch screen, may comprise the vehicle operator depressing a particular button associated with confirming that the mitigating action has taken place, etc.

Accordingly, proceeding to 1040, method 1000 may include indicating if such confirmation has been received. If not, method 1000 may proceed to 1045 where the vehicle may be prevented from being driven until confirmation has been received. For example, the vehicle may be prevented from being shifted from park at 1045. In other additional or alternative examples, an electrically-actuated parking brake (not shown) may be deployed, to prevent the vehicle from moving until confirmation is received.

Accordingly, at 1040, in response to confirmation that the refueling nozzle has been removed, method 1000 may proceed to 1050. At 1050, method 1000 may include updating vehicle operating parameters. Updating vehicle operating parameters may include enabling the vehicle to be driven, for example via allowing the vehicle to be shifted from park, releasing the parking brake, etc. Furthermore, updating vehicle operating parameters at 1000 may include updating the current level of fuel stored in the fuel tank, to reflect the refueling event. Method 1000 may then end.

Returning to FIG. 9 at step 905, if it is indicated that the energy receiving apparatus does not comprise the fuel tank, it may be understood that the energy receiving apparatus comprises the onboard energy storage device (e.g. 150). Accordingly, method 900 may proceed to FIG. 11.

Turning now to FIG. 11, method 1100 is depicted. It may be understood that method 1100 continues from method 900, and thus method 1100 is described with reference to the systems described herein, though it may be understood that similar methods may be applied to other systems without departing from the scope of this disclosure. As method 1100 continues from method 900, method 1100 may be carried out by a controller, such as controller 212 depicted at FIG. 2, and may be stored at the controller as executable instructions in non-transitory memory. Instructions for carrying out method 1100 and the rest of the methods included herein may be executed by the controller based on instructions stored on a memory of the controller and in conjunction with signals received from sensors of the engine system, such as the sensors described above with reference to FIGS. 1-7. The controller may employ actuators such as FTIV (e.g. 252), CVV (e.g. 297), coolant loop pump (e.g. 516), fan (e.g. 520), electric heater (e.g. 402), thermoelectric cooler (e.g. 406), first fan (e.g. 624), second fan (e.g. 626), motor/generator (e.g. 293), resistive coil (e.g. 628), third fan (e.g. 714), fourth fan (e.g. 716), compressor (e.g. 706), etc., to alter states of devices in the physical world according to the methods depicted below.

Method 1100 may be used to prepare the onboard energy storage device for receiving an increase in energy level (e.g. increasing charge stored at the onboard energy storage device). Discussed below with regard to method 1100, the onboard energy storage device is referred to as a battery, and the increase in energy level may be understood to comprise an increase in a charge level of the battery via recharging of the battery. Furthermore, the energy replenishment station is referred to as a recharging station. As mentioned above, the ability of the battery to receive charge (including the rate at which the battery may receive charge and the total amount of charge the battery may receive) may increase when the battery temperature is within an optimal or desired temperature range. In other words, when the battery temperature is within the desired temperature range, a highest state of current flow to the battery may be achieved. As one example, the desired temperature range may comprise a range between 68° F. and 72° F., however other desired temperature ranges are within the scope of this disclosure, as discussed above. Discussed herein the desired temperature range may be referred to as the desired temperature. While not explicitly illustrated, it may be understood that if it is determined that the battery is already at the desired temperature, then no further action may be taken and method 1100 may be aborted. However, if the temperature is not at the desired temperature, then method 1100 may proceed as discussed below.

Method 1100 begins at 1105, and may include estimating a duration until the vehicle is expected to stop at the energy replenishment station, which in this example may be understood to comprise a battery recharging station. Estimating the duration may be conducted in similar fashion as that described above at step 910 of method 900. Briefly, estimating the duration may involve determining, via the onboard navigation system, a distance to the energy replenishment station as inferred from the current path the vehicle is traveling. In response to a deviation from the inferred path, the estimated duration may be recalculated. In some examples, estimating the duration may additionally or alternatively include sending a request related to current traffic information via V2V and/or V2I communications, and receiving the information related to the request at the controller of the vehicle. Based on the information received, the estimated duration may be determined. The estimated duration may be further based on speed limits inferred, for example via the onboard navigation system, current vehicle speed and/or expected vehicle speed while traveling to the energy replenishment station. It may be understood, as will be discussed in further detail below, that the estimated duration may allow for controlling an aggressiveness and manner in which temperature control of the onboard energy storage device is conducted.

With the estimated duration determined at 1105, method 1100 may proceed to 1110. At 1110, method 1100 may include determining a level of aggressiveness, or in other words rate at which temperature of the battery is controlled to the desired temperature, and manner in which to control battery temperature to the desired temperature (e.g. desired temperature range) for accepting charge. Said another way, in order to accomplish charging of the battery at the recharging station in a manner that optimizes efficiency in terms of rate at which the battery recharges and total level of charge achieved, temperature of the battery may be controlled such that the temperature of the battery is at the desired temperature when the vehicle stops as the recharging station.

Accordingly, aggressiveness may be a function of distance and estimated duration from the recharging station, and how far from the desired temperature the battery currently is. For example, in a situation where distance until the recharging station is short and there is a large difference between battery temperature and the desired temperature, more aggressive temperature control may be used as compared to another situation where the distance is greater and there is a smaller difference between battery temperature and the desired temperature. It may be understood that aggressiveness may comprise a rate at which the battery temperature is controlled to the desired temperature, where more aggressive temperature regulation may refer to a faster rate at which temperature is controlled, and where less aggressive temperature regulation may refer to a slower rate at which temperature is controlled. It may further be understood that aggressiveness may change as the distance (and thereby duration) to the recharging station changes (e.g. becomes shorter as the vehicle travels to the recharging station) and the battery temperature becomes closer to the desired temperature. In other words, feedback from a temperature sensor (e.g. 408) may be relied upon for controlling battery temperature to the desired temperature, and the distance (and thereby duration) to the recharging station may be continually updated as the vehicle travels to the recharging station, so that the battery temperature may be controlled to the desired temperature in a manner such that the desired temperature is reached at a substantially similar time (e.g. within 30 seconds or less, within 1 minute or less, etc.) as when the vehicle arrives at the recharging station, as will be elaborated further below.

For example, referring to the system of FIG. 4, a rate at which the temperature is controlled may be a function of a rate and/or amount at which current is supplied to the thermoelectric heater (e.g. 402) or the thermoelectric cooler (e.g. 406). Similarly, referring to FIG. 5, the rate at which the temperature is controlled may be a function of a rate and/or amount at which current is supplied to the thermoelectric heater (e.g. 402) or the thermoelectric cooler (e.g. 406), and may further be a function of a speed at which the coolant loop pump (e.g. 516) is controlled to operate at. For example, the more current supplied to the thermoelectric heater (e.g. 402) and the faster the speed of the coolant loop pump (e.g. 526), the faster the rate at which temperature may be controlled to the desired temperature in a condition where it is desired to raise the temperature of the battery to the desired temperature. Thus, depending on the estimated duration, the controller may determine a speed at which the coolant pump is controlled, and an amount of current supplied to the thermoelectric heater or cooler. The speed of the coolant pump and the amount of current supplied to the thermoelectric heater or cooler may further be based on an estimate of how fast the battery will be heated or cooled, as a function of the speed of the coolant pump and the amount of current supplied to the thermoelectric heater or cooler. Thus, it may be understood that in this example, the controller may assess the estimated duration until the vehicle is expected to reach the recharging station, and may then determine a speed of the coolant pump and amount/rate of current supplied to the thermoelectric cooler or heater, such that the desired temperature of the battery is reached at a substantially similar time (e.g. within 30 seconds or less, within 1 minute or less, etc.) as when the vehicle arrives at the recharging station. As the vehicle is traveling to the recharging station, the controller may rely on the temperature sensor (e.g. 408) for adjusting the speed of the coolant pump and amount/rate of current supplied to the thermoelectric heater or cooler. In some examples, the controller may assess based on the predicted or inferred route that the vehicle will take to the recharging station how much regenerative braking energy may be available for controlling the coolant pump and amount/rate of current supplied to the thermoelectric heater or cooler, and may prioritize use of regenerative braking energy over other forms of energy such as energy from the battery (e.g. 150) or accessory battery (e.g. 404), when regenerative braking energy is available. For example, when regenerative braking energy is not available, the vehicle controller may rely on the battery or accessory battery to cool operate the coolant pump and thermoelectric heater or cooler. Then, when it is determined that regenerative braking energy is available, the controller may allocate the regenerative braking energy to operate the coolant pump and thermoelectric heater. Any regenerative braking energy not utilized for battery temperature control may be used to charge the battery. Similar logic as that discussed above applies to use of the system of FIG. 4 without the inclusion of the coolant pump.

In another example, referring to FIG. 6, the rate at which the temperature is controlled may be a function of one or more of a speed of the first fan (e.g. 624) and a speed of the second fan (e.g. 626). Specifically, increasing a speed of the first fan when the first fan is directing cool air (e.g. ambient air or cooled cabin air) at the battery may serve to increase the rate at which the battery is cooled to the desired temperature. Similar logic applies to a situation where the first fan is directing heated air (e.g. hot ambient air or heated cabin air) at the battery. Along similar lines, when current is supplied to the resistive coil (e.g. 628) so that the second fan (e.g. 626) may direct heated air at the battery to raise the temperature of the battery, as fan speed increases, more heated air may be directed at the battery thus increasing the rate at which the battery temperature is raised. Furthermore, as current supplied to the resistive coil increases, an amount of heat generated via the resistive coil may increase, which may thus serve to increase a rate at which the battery temperature is raised for a given speed of the second fan (e.g. 626). Still further, in cases where cooled or heated cabin air is utilized to cool or heat the battery, respectively, in some examples the rate at which the battery is cooled or heated may comprise a rate at which cooled or heated air is being directed to the cabin. For example, the hotter the cabin, the faster the rate of heating the battery and the cooler the cabin, the faster the rate of cooling the battery (where each are further a function of fan speed).

Thus, still referring to the system of FIG. 6, it may be understood that the controller may assess the estimated duration until the vehicle is expected to reach the recharging station, and may then determine a speed at which the first fan (e.g. 624) operates, or a speed at which the second fan (e.g. 626) operates, in order to control the temperature of the battery to the desired temperature at the substantially similar time (e.g. within 30 seconds or less, within 1 minute or less, etc.) as when the vehicle arrives at the recharging station. Where the second fan is utilized, amount of current supplied to the resistive coil may further be controlled as a function of second fan speed, for controlling the battery temperature to the desired temperature. In the case of reliance on the first fan (e.g. 624) when cabin air (e.g. heated or cooled) is directed at the battery, in some examples cabin temperature (e.g. a rate of heating of the cabin or a rate of cooling of the cabin) may be controlled as well as a function of how aggressive a rate of cooling or heating of the battery is desired. As discussed above with regard to the systems of FIGS. 4-5, a temperature sensor (e.g. 408) may be relied upon to monitor battery temperature, and estimated duration to the recharging station may continually be updated as the vehicle travels to the recharging station. In this way, speed at which the first fan is controlled, speed at which the second fan is controlled, rate of cabin heating or cooling, and/or rate of current supplied to the resistive coil may be modified in order to control the temperature of the battery to the desired temperature such that the desired temperature is reached at a substantially similar time (e.g. within 30 seconds or less, within 1 minute or less, etc.) as when the vehicle arrives at the recharging station. In some examples, the controller may assess based on the predicted or inferred route that the vehicle will take to the recharging station how much regenerative braking energy may be available for controlling first fan (e.g. 624) or second fan (e.g. 626) and in examples where the second fan is utilized, amount and rate of current applied to the resistive coil (e.g. 628), and may prioritize use of regenerative braking energy over other forms of energy such as energy from the battery (e.g. 150) or accessory battery (e.g. 404), when such regenerative braking energy becomes available. It may be understood that when there is an excess amount of regenerative braking energy, the excess may be used to charge the battery rather than control temperature of the battery. When regenerative braking energy is not available for temperature control, then it may be understood that energy for temperature control may be supplied by the battery or accessory battery.

In terms of the cooling system of FIG. 7, a speed of the compressor (e.g. 706) may impact the rate at which the battery is controlled to the desired temperature when it is desired to cool the battery to the desired temperature. However, the rate at which the system of FIG. 7 may cool the battery may be further dependent on speed of the third fan (e.g. 714) and speed of the fourth fan (e.g. 716). For example, the third fan (e.g. 714) is used to direct air across the condenser (e.g. 708) to reject heat from the refrigerant loop (e.g. 702). Thus, as speed of the third fan increases, more heat is rejected from the refrigerant loop. Still further, the fourth fan (e.g. 716) is used to direct cool air across the evaporator (e.g. 704) to cool the battery. Accordingly, as speed of the compressor (e.g. 706), speed of the third fan (e.g. 714) and speed of the fourth fan (e.g. 716) increase, the rate at which the battery is cooled may increase.

Thus, still referring to the system of FIG. 7, it may be understood that the controller may assess the estimated duration until the vehicle is expected to reach the recharging station, and may then determine a speed at which the third fan (e.g. 714) operates, a speed at which the fourth fan (e.g. 716) operates, and a speed at which the compressor (e.g.

706) operates in order to control the temperature of the battery to the desired temperature at the substantially similar time (e.g. within 30 seconds or less, within 1 minute or less, etc.) as when the vehicle arrives at the recharging station. In some examples, the controller may assess based on the predicted or inferred route that the vehicle will take to the recharging station how much regenerative braking energy may be available for controlling the third fan (e.g. 714) and/or the fourth fan (e.g. 716) and/or the compressor (e.g. 706), and may prioritize use of regenerative braking energy over other forms of energy such as energy from the battery (e.g. 150) or accessory battery (e.g. 404), when regenerative braking energy is available, as discussed above. Furthermore, a temperature sensor (e.g. 408) may be relied upon for battery temperature feedback, such that as the distance (and thereby duration) to the recharging station decreases, the vehicle controller may adjust speeds of the third fan, fourth fan and/or speed at which the compressor operates in order to control the temperature of the battery to the desired temperature at the substantially similar time as when the vehicle arrives at the recharging station.

Thus, based on the above discussion, it may be understood that the manner in which the temperature regulation of the battery is controlled may comprise any one of the examples described above with regard to FIGS. 4-7. In some examples, the manner in which the temperature regulation is controlled may be a function of what system out of the systems described above with regard to FIGS. 4-7 are included in the vehicle. It may be understood that in some examples, there may be more than one system out of the systems described above with regard to FIGS. 4-7 included in the vehicle. As one example, the vehicle may include the system of FIG. 4 where temperature control of the battery may be controlled via a thermoelectric heater (e.g. 402) and/or a thermoelectric cooler (e.g. 406), and may further include the system of FIG. 6, where fans (e.g. 624 and 626) may be utilized to direct an air flow across the battery in order to conduct temperature control of the battery. In such a case, depending on whether the battery is requested to be cooled to the desired temperature or heated to the desired temperature, the controller may assess whether the cabin has been cooled (e.g. via air-conditioning), or heated, respectively. Based on a difference between the current battery temperature and the desired temperature, presence or absence of heated or cooled cabin air, estimated duration until the vehicle reaches the recharging station, energy cost of utilizing the thermoelectric heater or cooler as compared to the first fan (e.g. 624), etc., the controller may determine a most energy efficient manner in which to control battery temperature to the desired temperature. In a case where battery temperature is requested to be cooled and there is a presence of cooled cabin air deemed sufficient to cool the battery to the desired temperature, then the first fan may be relied upon to direct the cooled cabin air at the battery as opposed to relying on the thermoelectric cooler, so that use of energy may be minimized. In other examples, a combination of cooled cabin air and thermoelectric cooling may be used in such a circumstance where battery cooling is desired. Specifically, the vehicle controller may request cooling of the battery via controlling a speed of the first fan to direct cooled cabin air at the battery for a portion of the distance the vehicle travels to the recharging station, and then thermoelectric cooling may be used for another portion. Such an example is meant to be illustrative and it may be understood that any combination of elements with regard to the systems of FIGS. 4-7 may be relied upon (where available in the vehicle) for controlling battery temperature to the desired temperature in a manner that minimizes total energy consumption by the vehicle. Furthermore, it may be understood that for any example of battery temperature control as discussed above, regenerative braking energy may be prioritized for powering components for battery temperature control over use of the battery or accessory battery, when such regenerative braking energy becomes available.

Proceeding to 1115, method 1100 may include initiating the temperature control of the battery to reach the desired temperature as a function of the estimated duration of time until the vehicle stops at the refueling station. As discussed above, there may be different options for controlling such temperature control, and such options have been discussed in detail above and with regard to FIGS. 4-7. It may be understood that any one of the systems described herein may be used for conducting temperature regulation, where use of any one of the systems may be determined based on 1) whether the system is included in the vehicle, and 2) minimizing energy consumption for conducting the temperature control.

Accordingly, with the temperature management control operation initiated at 1115, it may be understood that feedback from a temperature sensor (e.g. 408) may be relied upon for determining temperature of the battery, such that control strategy may control the temperature of the battery to the desired temperature. While not explicitly illustrated, as discussed above there may be other feedback control for controlling battery temperature to the desired temperature. For example, the onboard navigation system may continually be utilized to update the estimated duration until the vehicle stops at the battery recharging station, such that the temperature management control strategy may be updated to control the temperature to the desired temperature such that the desired temperature is reached at a substantially similar time as when the vehicle stops at the recharging station. It may thus be understood that aggressiveness and/or manner in which the temperature control strategy controls battery temperature to the desired temperature may be updated as the vehicle travels to the recharging station. For example, if the vehicle deviates from a predicted route to the recharging station, temperature control strategy may be adjusted. If there is an unexpected issue pertaining to traffic that either allows for the vehicle to reach the recharging station earlier, or in other examples later, than predicted or inferred, then temperature control strategy may be adjusted.

Accordingly, with temperature control regulation initiated at 1115, method 1100 may proceed to 1125. At 1125, method 1100 may include indicating whether the vehicle has stopped at the recharging station. Such an indication may be provided to the controller via the onboard navigation system, for example. If the vehicle is not indicated to have stopped at the recharging station, method 1100 may proceed to 1130. At 1130, method 1100 may include continuing to control the battery temperature to the desired temperature if the desired temperature has not been reached. Alternatively, in a case where the desired battery temperature is indicated to have been reached, at 1130, method 1100 may include maintaining battery temperature at the desired temperature.

Returning to 1125, in response to an indication that the recharging station has been reached, method 1100 may proceed to 1135. At 1135, method 1100 may include indicating whether battery charging has been initiated. For example, as discussed above, electrical energy may be supplied to the battery (e.g. 150) from an external power source (e.g. 180) via an electrical energy transmission cable (e.g. 182). When such an external power source is electrically coupled to the vehicle for increasing an SOC of the battery, the controller may detect such action and may indicate whether battery charging has been initiated. In a case where the battery is charge wirelessly (e.g. via inductive charging), an increase in SOC may indicate the initiation of battery charging. Thus, whether via a transmission cable or via wireless charging, battery charging may be understood to be initiated when an increase in SOC of the battery is determined.

If, at 1135, battery charging is not indicated to be initiated, method 1100 may proceed to 1140. At 1140, method 1100 may include indicating whether a threshold duration has elapsed. The threshold duration may be of a duration where, if elapsed, it may no longer be energy efficient to maintain battery temperature control. For example, as will be discussed below, there may be circumstances where the vehicle operator changes their mind as to recharging. Such an example may occur when the recharging station is also a place of work of the vehicle operator, a location where the vehicle operator is meeting a friend and plans change, etc. Accordingly, if at 1140 the threshold duration has not yet elapsed, method 1100 may proceed to 1145. At 1145, method 1100 may include continuing to maintain battery temperature at the desired temperature until battery charging is initiated or the threshold duration elapses. It may be understood that in order to maintain desired battery temperature the controller may be kept awake for controlling one or more of the temperature control management systems of FIGS. 4-7.

Returning to 1140, in a situation where the threshold duration elapses, method 1100 may proceed to 1150. At 1150, method 1100 may include requesting confirmation as to whether to continue temperature management. Such a confirmation request may, as discussed in detail above, include an audible request initiated by the controller and delivered, for example, via a speaker associated with the vehicle instrument panel (or other vehicle speakers). Additionally or alternatively, the request may be communicated to the vehicle operator via a screen (e.g. touch screen) associated with the vehicle instrument panel. Additionally or alternatively, the audible request may be in the form of an audible signal interpretable via the vehicle operator as a request for confirmation as to whether to continue with temperature management, such as a chime, particular pattern of sound, etc. Additionally or alternatively, the request may be in the form of a text message or email sent to a mobile device (e.g. smartphone, laptop, tablet, etc.), for requesting confirmation in a situation where the vehicle operator may have departed the vehicle.

With the request for confirmation sent at 1150, method 1100 may proceed to 1155. At 1155, method 1100 may include indicating whether confirmation is received. Confirmation may be received via one or more of audibly (e.g. via voice recognition via the vehicle instrument panel), via a button presented on a touch screen associated with the vehicle instrument panel, via a button on the vehicle dash, by confirming through text message, email, etc. in a manner interpretable via the controller as confirmation.

If, at 1155, confirmation is not received, method 1100 may proceed to 1160. While not explicitly illustrated, it may be understood that it may be indicated that confirmation is not received if a second threshold duration related to the confirmation elapses without the confirmation being received. At 1160, method 1100 may include discontinuing battery temperature management, and may further include updating vehicle operating parameters. For example, battery SOC may be updated, and a flag may be set at the controller for alerting the vehicle operator that it may be desirable to charge the battery at the next available opportunity. The controller may then be slept, and method 1100 may end.

Alternatively, if at 1155 confirmation is received, then the controller may continue to command the temperature control management strategy to maintain battery temperature at the desired temperature until battery charging is initiated.

Thus, at 1135, in response to battery charging being initiated, method 1100 may proceed to 1165. At 1165, method 1100 may include maintaining desired battery temperature during the recharging operation. Specifically, as the act of charging the battery may result in heat generation which may, if mitigating action is not taken, result in battery temperature being different than the desired temperature, or in other words, outside a desired temperature range where charging efficiency is greatest, while the charging operation is in progress. As it is undesirable for battery temperature to differ from the desired temperature during recharging, the temperature management control strategy may continue during the recharging operation. It may be understood that power for controlling one or more of the systems discussed above with regard to FIGS. 4-7 for battery temperature management may be provided via the external power supply while the battery is charging.

Proceeding to 1170, method 1100 may include indicating whether the charging operation has been completed. For example, SOC may be monitored during the charging operation, and charging may be indicated to be complete once SOC reaches a predetermined maximum SOC. In other examples, when the SOC plateaus for a predetermined time (e.g. 1 minute, 2 minutes, etc.), it may be indicated that the recharging operation is finished. In still other examples, the recharging operation may be indicated to be complete once the controller detects that the external power supply has been physically uncoupled from the vehicle.

Once charging is indicated to be complete, method 1100 may proceed to 1175. At 1175, method 1100 may include discontinuing battery temperature management. Continuing to 1180, method 1100 may include updating vehicle operating parameters. For example, updating vehicle operating parameters may include updating the SOC of the battery. Method 1100 may then end.

Turning now to FIG. 13, an example timeline 1300 for preparing an energy receiving apparatus for an increase in level of energy storage therein, is depicted. In this example timeline, it may be understood that the energy receiving apparatus comprises a fuel tank (e.g. 220). Accordingly, timeline 1300 includes plot 1305, indicating whether proximity to an energy replenishment station (liquid fuel refueling station in this example timeline) is detected (yes or no), over time. Timeline 1300 further includes plot 1310, indicating whether a confirmation request has been sent to the vehicle operator (yes, no or non-applicable) to confirm whether to prepare the fuel tank for receiving fuel or not, over time. Timeline 1300 further includes plot 1315, indicating whether the confirmation request has been confirmed, or in other words, received at the controller (yes, no or non-applicable), over time. Timeline 1300 further includes plot 1320, indicating temperature of a fuel vapor storage canister (e.g. 222), over time. Canister temperature may either higher (+) or lower (−), over time. Timeline 1300 further includes plot 1325, indicating pressure in the fuel tank, over time. Fuel tank pressure may be higher (+) or lower (−), over time. Timeline 1300 further includes plot 1330, indicating status of the FTIV (e.g. 252), and plot 1335, indicating status of the CVV (e.g. 297), over time. For each of plots 1330 and 1335, the respective valves may be open or closed, over time.

Timeline 1300 further includes plot 1340, indicating whether the refueling station has been reached (yes or no), over time. Timeline 1300 further includes plot 1345, indicating whether the refueling lock (e.g. 245) is locked or unlocked, over time. Timeline 1300 further includes plot 1350, indicating fuel level in the fuel tank, over time. Timeline 1300 further includes plot 1355, indicating whether or not a fuel nozzle for dispensing fuel into the fuel tank has been removed (yes, no or non-applicable), over time.

At time t0, it may be understood that the vehicle is being propelled, and that at time t0 proximity to a refueling station has not been detected (plot 1305), where proximity may be determined as discussed above with regard to step 810 of FIG. 8. Because such proximity has not been detected, a confirmation request related to preparing the fuel tank for receiving fuel has not been sent (plot 1310). Because such a confirmation request has not been sent, such a request has furthermore not been received (1315) at the controller. Canister temperature is high (plot 1320), and is above the canister temperature threshold represented by dashed line 1321. It may be understood that the canister temperature threshold comprises a temperature where, if above, canister temperature regulation may be requested via the controller in response to an indication of proximity to the refueling station, as discussed above. Furthermore, at time t0, fuel tank pressure is high (plot 1325), and is above a fuel tank depressurization threshold, represented by dashed line 1326. For example, when fuel tank pressure is above the fuel tank depressurization threshold, fuel tank depressurization may be initiated in response to an indication of proximity to the refueling station.

Still further, at time t0, the FTIV is closed (plot 1330), and the CVV is open (plot 1335). A refueling station has not been reached (plot 1340), and the refueling lock for allowing fuel to be delivered to the fuel tank is locked (plot 1345). Fuel level (plot 1350) is below a fuel level threshold represented by dashed line 1351. It may be understood that in some examples, if fuel level is above the fuel level threshold, even when proximity to a refueling station is detected, a request for confirmation may not be sent, although in other examples regardless of fuel level a confirmation request may be sent when proximity to a refueling station is detected. However, by only sending such a request when fuel level is below the fuel level threshold, redundant requests may be avoided, which may be more desirable to a vehicle operator. In other words, rather than repeatedly having to respond to a confirmation request pertaining to whether or not the vehicle operator desires to refuel at a particular detected refueling station (which may be frequent depending on the particular driving route), if such requests are limited to when fuel level is below the threshold, customer satisfaction may be improved. Finally, at time t0, since the vehicle is not currently being refueling, whether or not a nozzle has been removed from the fuel tank does not apply (n/a) (plot 1355).

At time t1, proximity to a refueling station is detected (plot 1305), for example via one or more of the onboard navigation system, via V2V and/or V2I communications, based on learned routes stored at the controller and/or onboard navigation system, etc. With fuel level in the fuel tank below the fuel level threshold (see plot 1350 in relation to line 1351), a confirmation request is sent to the vehicle operator at time t2, requesting confirmation as to whether the vehicle operator intends to stop at the refueling station detected in order to refuel the fuel tank. Details regarding such a confirmation request have been provided above at step 825 of method 800, and for brevity will not be further discussed here. Briefly, it may be understood that the request may be provided audibly, visually (e.g. via a touch screen associated with the vehicle instrument panel), etc. In some examples, the request may include information pertaining to the precise location of the refueling station detected.

With the request for confirmation commanded via the controller at time t2, at time t3 the confirmation request is received in the affirmative at the controller. Such receiving of the request for confirmation has been discussed in detail above with regard to step 830 of method 800, and for brevity, will not be further discussed here. However, it may be understood that the confirmation may include one or more of a verbal confirmation, confirmation via pressing a button on a touchscreen associated with the vehicle instrument panel, confirmation via pressing a particular button at the vehicle dash, etc. The controller may postpone any action related to preparing the fuel tank and/or canister for an upcoming refueling event until such confirmation is received.

With confirmation received at the controller at time t3, the controller commands actions for preparing for the upcoming refueling event. Specifically, while not explicitly illustrated, the controller assesses an estimated duration until the vehicle is expected to arrive at the refueling station. Based on such an estimate, fuel tank depressurization is controlled such that the pressure in the fuel tank drops below the fuel tank pressure threshold at a substantially similar time as when the vehicle stops at the refueling station. Furthermore, because canister temperature is above the canister temperature threshold (dashed line 1321), canister temperature regulation is additionally initiated, while not explicitly shown. For example, at time t3, one or more of a cooling fan (e.g. 330) and/or Peltier elements (e.g. 314a, b) may be controlled to reduce canister temperature to below the canister temperature threshold. Such control may additionally be based on the estimated duration until the vehicle is expected to arrive at the refueling station, as discussed above, so that canister temperature drops below the canister temperature threshold at a substantially similar time that the vehicle arrives at the refueling station.

Accordingly, between time t3 and t4, the FTIV is duty cycled as a function of the fuel tank pressure and estimated duration until the vehicle reaches the refueling station. As such, fuel tank pressure drops between time t3 and t4. Furthermore, with canister temperature regulation being conducted (not specifically illustrated for simplicity), canister temperature declines between time t3 and t4.

At time t4, canister temperature reaches the canister temperature threshold and fuel tank pressure reaches the fuel tank pressure threshold (see plots 1320 and 1325, respectively). Based on the onboard navigation system and/or V2V/V2I communications, it is communicated to the controller that the vehicle has reached the refueling station. Accordingly, with fuel tank pressure having reached the fuel tank pressure threshold, the refueling lock is commanded open (plot 1345). In this example timeline it may be understood that the refueling lock is electronically actuated open via the controller, but in other examples the refueling lock may mechanically open when a refueling request is received by the controller and further in response to fuel tank pressure dropping below the fuel tank pressure threshold. By depressurizing the tank before the vehicle arrives at the refueling station, there may be essentially no wait time for fuel tank depressurization when the vehicle arrives at the refueling station, which may improve customer satisfaction with regard to refueling operations. Furthermore, by controlling canister temperature to or below the canister temperature threshold prior to refueling, adsorption of fuel vapors during the refueling operation may be improved, which may reduce opportunity for release of undesired evaporative emissions to atmosphere. Still further, by controlling canister temperature to or below the canister temperature threshold while the vehicle is traveling to the refueling station, such action may not have to take place upon the vehicle arriving at the refueling station, which may allow for immediate refueling, similar to the advantages discussed with regard to fuel tank depressurization.

Between time t4 and t5, fuel is added to the fuel tank. Accordingly, fuel level in the fuel tank is indicated to increase between time t4 and t5 (plot 1350), as indicated for example, via the fuel level indicator (e.g. 234). Fuel tank pressure during refueling (plot 1325), where refueling includes the FTIV being open (plot 1330) and the CVV being open (plot 1335), rises and then plateaus. However, at time t5, a pressure spike in the fuel tank is indicated, the result of the fill level vent valve (FLVV) (e.g. 285) closing in response to fuel level reaching a capacity of the tank. With the FLVV closed, pressure rapidly builds in the tank, which in turn shuts off the fuel nozzle which is delivering fuel to the tank. Once fuel shuts off, pressure in the tank rapidly declines to below the fuel tank pressure threshold (see line 1326) by time t6 (see plot 1325).

With fuel tank pressure below the fuel tank pressure threshold at time t6, conditions are met for conducting the diagnostic (see FIG. 10) for determining whether the fuel nozzle remains in the fuel filler neck or in other words, remains mechanically coupled to the vehicle. Accordingly, at time t6, the CVV is commanded closed. With the CVV commanded closed, pressure in the fuel tank builds to the pressure build threshold (refer to step 1015 of FIG. 10), represented by dashed line 1327. Accordingly, at time t7, it is confirmed at the controller that the nozzle is removed (plot 1355). Thus, no alerts have to be sent to the operator to inform said operator of a request to remove the nozzle. If pressure did not build to the nozzle diagnostic pressure threshold, then it may be inferred that the nozzle still remains mechanically coupled to the vehicle, as discussed above with regard to FIG. 10 and FIG. 12.

With nozzle removal having been determined at time t7, the CVV is commanded open (plot 1335). Pressure in the fuel tank decays between time t7 and t8, and at time t8 the FTIV is commanded closed (plot 1330). At time t9, the refueling lock is once again locked, and it may be understood that after time t9 the vehicle may drive away from the refueling station.

Turning now to FIG. 14, another example timeline 1400 is depicted for preparing an energy receiving apparatus for accepting an increase in energy storage level. Specifically, with regard to FIG. 14, the energy receiving apparatus comprises an onboard energy storage device (e.g. 150) referred to below as a battery. Example timeline 1400 includes plot 1405, indicating whether proximity to an energy replenishment station is detected (yes or no), over time. In terms of timeline 1400, the energy replenishment station may be understood to comprise a battery recharging station. Timeline 1400 further includes plot 1410, indicating whether a confirmation request has been sent (yes, no or non-applicable), over time, where the confirmation request includes a request for confirmation as to whether the vehicle operator intends to recharge the battery at the recharging station for which proximity was detected. Timeline 1400 further includes plot 1415, indicating whether the confirmation request has been received at the controller (yes, no or non-applicable), over time. Timeline 1400 further includes plot 1420, indicating a temperature of the battery, over time. Battery temperature may be higher (+) or lower (−), over time. Timeline 1400 further includes plot 1425, indicating a status of the thermoelectric cooler (e.g. 406), over time. Current provided to the thermoelectric cooler may increase over time, or may decrease over time, where it may be understood that values greater than "off" on the y-axis (see inset 1450) indicate that the current is being provided to the thermoelectric cooler, where the greater the height along the y-axis the greater the amount of current provided. Timeline 1400 further includes plot 1430, indicating a battery SOC, over time. Battery SOC may be higher (+) or lower (−), over time. Timeline 1400 further includes plot 1435, indicating whether the recharging station has been reached (yes or no), over time. Timeline 1400 further includes plot 1440, indicating whether battery charging has been initiated (yes or no), over time. It may be understood that battery charging for plot 1440 refers to charging of the battery from an external power source at the recharging station. Timeline 1400 further includes plot 1445, indicating whether regenerative braking energy is available (yes or no) over time.

At time t0, proximity to an energy replenishment station (e.g. battery recharging station in this timeline) has not been detected (plot 1405). As discussed above, proximity may comprise a predetermined distance from, predetermined amount of time t0 get to, etc., the recharging station. Accordingly, a confirmation request has not been sent (plot 1410), and accordingly, no confirmation request has been received (plot 1415). Battery temperature (plot 1420) is greater than an upper temperature threshold, represented by dashed line 1422, which is greater than a lower temperature threshold, represented by dashed line 1421. It may be understood that as discussed herein, the desired temperature for recharging the battery in terms of efficiency, maximum amount of charge accepted, etc., is temperatures between the upper temperature threshold and the lower temperature threshold. However, for simplicity, discussed herein with regard to FIG. 14, temperatures between the upper and lower temperature thresholds are referred to simply as "desired temperature."

As proximity to the recharging station has not been indicated, battery temperature control is not currently being conducted (plot 1425). Battery SOC (plot 1430) is currently below a threshold SOC, indicated by dashed line 1431. In some examples, a confirmation request may only be sent to the vehicle operator under circumstances where proximity to a recharging station is detected and battery SOC is below the threshold SOC. In some examples, an estimated or predicted distance until the vehicle reaches a final destination (e.g. estimated or predicted via route learning, route plugged into the onboard navigation system, etc.) may be factored into whether or not to issue the confirmation request. In this way, not every time the vehicle passes by a recharging station will the confirmation request be initiated, which may avoid the vehicle operator having to repeatedly deny the intention to recharge. However, in other examples the confirmation request may be sent even if battery SOC is greater than the threshold SOC and regardless of estimated/predicted distance to the final destination.

Furthermore, at time t0, because proximity to the recharging station has not been indicated, the recharging station has not been reached (plot 1435), and battery charging has not been initiated (plot 1440). Finally, regenerative braking energy is not currently available at time t0 (plot 1445).

At time t1, proximity to a recharging station is detected, as discussed above, via one or more of the onboard navigation system, V2V and/or V2I communications, learned driving routines, etc. Accordingly, with battery SOC below the threshold SOC (refer to plot 1430 in relation to dashed line 1431), a confirmation request is sent at time t1, requesting confirmation from the vehicle operator as to whether the vehicle operator intends to stop at the detected recharging station. It may be understood that such a confirmation request is generated via the controller, and the confirmation request may be audibly sent (e.g. via speakers associated with the vehicle instrument panel, or other vehicle speakers), visually sent (e.g. via a touchscreen associated with the vehicle instrument panel), etc.

At time t3, the confirmation request is received in the affirmative, indicating that the vehicle operator intends to stop at the recharging station that has been detected to be in close proximity to the vehicle. The confirmation request being received may be received verbally, or may be input into, for example a touchscreen associated with the vehicle instrument panel, via a button or other actuator associated with the vehicle instrument panel, via a text-based response via a smartphone, etc. Further details regarding the sending of the confirmation request and the receiving of the confirmation request has been discussed above with regard to steps 820 and 825 of method 800, respectively. The controller may postpone any action related to preparing the battery for receiving an increase in SOC until the confirmation request is received in the affirmative.

With the confirmation request received in the affirmative at time t3, and with battery temperature above the upper threshold, at time t4 battery temperature management control is initiated (plot 1425). While not explicitly illustrated, it may be understood that once the confirmation request has been received in the affirmative, the controller may (in conjunction with one or more of the onboard energy storage device and/or V2V/V2I communications, learned driving routines stored at the controller, etc.), estimate an amount of time until the vehicle is expected to arrive at the recharging station. Based on the estimate, a manner and aggressiveness in which the temperature control of the battery is controlled may be determined, as discussed above. In this example timeline, the controller determines that use of the thermoelectric cooler (e.g. 406) comprises a most efficient way in terms of energy usage to cool the battery, and accordingly, at time t4 thermoelectric cooling is initiated. Between time t4 and t5, current supplied to the thermoelectric heater rises and then decays, in accordance with continually updated distance (and thereby duration) to the recharging station, and feedback from the temperature sensor (e.g. 408) that indicates battery temperature. Between time t4 and t5, battery temperature decreases, and it may be understood that power for operating the thermoelectric cooler is via the battery, as regenerative braking is not available between time t4 and t5 (see plot 1445).

At time t5, regenerative braking energy becomes available, and thus, it may be understood that between time t5 and t6, power for operating the thermoelectric cooler is supplied via regenerative braking energy and not the battery.

At time t6 battery temperature is indicated to reach the desired temperature at a substantially similar time (e.g. within 30 seconds or less, within 1 minute or less, etc.) as the vehicle is indicated to stop at the recharging station (plot 1435). Once stopped, there may be a threshold duration of time, represented by 1441, where if battery charging is not initiated a request may be sent to the vehicle operator to inquire whether the vehicle operator intends to proceed with the recharging or not. However, in this example timeline, at time t7, battery recharging is initiated. Between time t7 and t8, battery SOC increases (plot 1430), and battery temperature control is maintained (see plots 1430 and 1425, respectively). It may be understood that once battery recharging is initiated, battery temperature control via the thermoelectric cooler may be powered via the external power source at the recharging station. Thus, between time t7 and t8, the thermoelectric cooler powered via power from the external power source maintains battery temperature at the desired temperature during the recharging of the battery. At time t8, battery charging is indicated to be discontinued (plot 1440), and accordingly, battery temperature control is discontinued (plot 1425). It may be understood that after time t8, the vehicle may be driven away from the recharging station if desired.

In this way, by conducting actions to prepare a vehicle system for receiving an increase in energy supply, for example for receiving liquid fuel or increasing a state of charge of a battery, when it is confirmed that it is the intent of the vehicle operator to stop at a particular energy replenishment station, a time-frame for receiving the increase in energy and/or an efficiency with regard to receiving the increase in energy supply, may be improved. Furthermore, in some examples such actions may reduce a potential for release of undesired evaporative emissions to atmosphere.

The technical effect is to recognize that, when a proximity of a vehicle to a particular energy replenishment station is detected while the vehicle is traveling, rather than initiating particular actions under an assumption that the vehicle operator may travel to the particular energy replenishment station, such actions may be postponed until confirmation is received from the vehicle operator that the vehicle operator intends to stop at the particular energy replenishment station. Accordingly, a technical effect is to recognize that, upon determining a proximity to an energy replenishment station the vehicle controller may initiate a query to the vehicle operator to ask for confirmation as to whether the vehicle operator intends to stop at the particular energy replenishment station for the purpose of increasing an energy supply at an energy storage apparatus of the vehicle. A further technical effect is to recognize that, by initiating such actions in response to confirmation from a vehicle operator, issues pertaining to wasted energy, increased potential for release of undesired evaporative emissions to atmosphere, wear and tear on valves and/or other vehicle componentry, decreased fuel economy, etc., may be reduced or avoided. In turn, customer satisfaction may be improved.

Thus, the systems and methods described herein may enable one or more systems and one or more methods. In one example, a method comprises via a controller, preparing an energy receiving apparatus of a vehicle for receiving an increase in a level of energy storage from an energy replenishment station while the vehicle is traveling to the energy replenishment station, in response to a vehicle operator confirming at the controller an intent to stop at the energy replenishment station to increase the level of energy storage at the energy receiving apparatus. In a first example of the method, the method further includes wherein confirming the intent to stop at the energy replenishment station is in response to a request via the controller to confirm the intent. A second example of the method optionally includes the first example, and further includes wherein the request is generated in response to an indication that the vehicle is within a predetermined proximity to the energy replenishment station. A third example of the method optionally includes any one or more or each of the first through second examples, and further includes wherein the request is in a form of an audible or visual request generated via the controller. A fourth example of the method optionally includes any one or more or each of the first through third examples, and further includes wherein confirming at the controller the intent to stop is via an audible or manual confirmation via the operator. A fifth example of the method optionally includes any one or more or each of the first through fourth examples, and further includes wherein the energy replenishment station comprises a refueling station and where the energy receiving apparatus comprises a fuel tank. A sixth example of the method optionally includes any one or more or each of the first through fifth examples, and further includes wherein preparing the energy receiving apparatus of the vehicle for receiving the increase in a level of energy storage further comprises depressurizing the fuel tank while the vehicle is traveling to the refueling station. A seventh example of the method optionally includes any one or more or each of the first through sixth examples, and further includes wherein preparing the energy receiving apparatus of the vehicle further comprises controlling a temperature of a fuel vapor storage canister that captures and stores fuel vapors from the fuel tank to below a threshold canister temperature. An eighth example of the method optionally includes any one or more or each of the first through seventh examples, and further includes wherein the energy replenishment station comprises a recharging station and where the energy receiving apparatus comprises a battery. A ninth example of the method optionally includes any one or more or each of the first through eighth examples, and further includes wherein preparing the energy receiving apparatus for receiving the increase in the level of energy storage further comprises controlling a temperature of the energy receiving apparatus to below an upper temperature threshold and above a lower temperature threshold. A tenth example of the method optionally includes any one or more or each of the first through ninth examples and further includes wherein controlling the temperature includes controlling a rate and amount of current supplied to a thermoelectric heater or cooler.

Another example of a method comprises detecting that a vehicle is within a predetermined proximity to a refueling station for increasing a level of liquid fuel at a fuel tank of the vehicle; requesting a response from an operator of the vehicle as to whether the vehicle will be driven to the refueling station to increase the level of liquid fuel at the fuel tank; and in response to the operator confirming in an affirmative that the vehicle will be driven to the refueling station to increase the level of liquid fuel at the fuel tank, controlling a fuel tank depressurization routine so that the fuel tank is depressurized to below a threshold fuel tank pressure at a substantially similar time as when the vehicle arrives at the refueling station. In a first example of the method, the method further includes wherein the substantially similar time comprises within one minute or less of the vehicle arriving at the refueling station. A second example of the method optionally includes the first example, and further comprises in response to the vehicle operator confirming that the vehicle will not be driven to the refueling station to increase the level of liquid fuel at the fuel tank, postponing controlling the fuel tank depressurization routine. A third example of the method optionally includes any one or more or each of the first through second examples, and further includes wherein requesting the response is via an audible message communicated to the vehicle operator; and wherein the operator confirming in the affirmative is via an audible response to the request. A fourth example of the method optionally includes any one or more or each of the first through third examples, and further includes wherein controlling the fuel tank depressurization involves controlling a duty cycle of a fuel tank isolation valve that seals the fuel tank from atmosphere. A fifth example of the method optionally includes any one or more or each of the first through fourth examples, and further comprises subsequent to increasing the level of liquid fuel at the fuel tank, conducting a pressure-based diagnostic on the fuel tank to determine whether a fuel dispensing nozzle for increasing the level of liquid fuel at the fuel tank remains mechanically coupled to the vehicle; and in response to an indication that the fuel dispensing nozzle remains mechanically coupled to the vehicle, issuing an alert to the operator to remove the fuel dispensing nozzle and preventing the vehicle from being moved until confirmation is received that the fuel dispensing nozzle has been decoupled from the vehicle.

An example of a system for a vehicle comprises a fuel tank selectively fluidically coupled to a fuel vapor storage canister via a fuel tank isolation valve; a thermal management system for the fuel vapor storage canister; a wireless communications system; and a controller with computer readable instructions stored on non-transitory memory that when executed while the vehicle is in operation, cause the controller to: retrieve information via the wireless communications system pertaining to a proximity of the vehicle to a refueling station for use in increasing a level of fuel at the fuel tank; send a request to an operator of the vehicle to confirm whether the operator plans to stop at the refueling station to increase the level of fuel at the fuel tank during a refueling event; and in response to the operator confirming plans to stop at the refueling station to increase the level of fuel at the fuel tank, controlling the fuel tank isolation valve and the thermal management system as a function of an estimated duration of time until the vehicle arrives at the refueling station to prepare the fuel tank and the fuel vapor storage canister for the refueling event. In a first example of the system, the system further includes wherein controlling the fuel tank isolation valve includes controlling a duty cycle of the fuel tank isolation valve; and wherein the controller stores further instructions to control the duty cycle of the fuel tank isolation valve so that a pressure in the fuel tank decreases to or below a fuel tank pressure threshold at a substantially similar time as when the vehicle stops at the refueling station based on the estimated duration. A second example of the system optionally includes the first example, and further includes wherein controlling the thermal management system of the fuel vapor storage canister further comprises controlling a temperature of the fuel vapor canister to or below a threshold canister temperature; and wherein the controller stores further instructions to control the temperature of the fuel vapor canister so that the threshold canister temperature is reached at a substantially similar time as when the vehicle stops at the refueling station based on the estimated duration.

In another representation, a method comprises determining that a vehicle is within a threshold distance of an energy replenishment station, and in response to a controller of the vehicle receiving an indication that an operator of the vehicle does not intend to stop at the energy replenishment station, postponing an operation to prepare an energy receiving apparatus for receiving an increase in a level of energy storage at the energy replenishment station. In such a method, postponing the operation may reduce a use of energy storage of the vehicle as compared to a situation where the operation is undertaken and where the operator does not intend to stop at the energy replenishment station. In such a method, postponing the operation may additionally or alternatively reduce wear and tear on one or more valves and/or components of the vehicle. In such a method, postponing the operation may additionally or alternatively reduce release of undesired evaporative emissions to atmosphere.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
a fuel tank selectively fluidically coupled to a fuel vapor storage canister via a fuel tank isolation valve;
a thermal management system for the fuel vapor storage canister;
a wireless communications system; and
a controller with computer readable instructions stored on non-transitory memory that when executed while the vehicle is in operation, cause the controller to:
retrieve information via the wireless communications system pertaining to a proximity of the vehicle to a refueling station for use in increasing a level of fuel at the fuel tank;
send a request to an operator of the vehicle to confirm whether the operator plans to stop at the refueling station to increase the level of fuel at the fuel tank during a refueling event; and
in response to the operator confirming plans to stop at the refueling station to increase the level of fuel at the fuel tank, controlling the fuel tank isolation valve and the thermal management system as a function of an estimated duration of time until the vehicle arrives at the refueling station to prepare the fuel tank and the fuel vapor storage canister for the refueling event.

2. The system of claim 1, wherein controlling the fuel tank isolation valve includes controlling a duty cycle of the fuel tank isolation valve; and
wherein the controller stores further instructions to control the duty cycle of the fuel tank isolation valve so that a pressure in the fuel tank decreases to or below a fuel tank pressure threshold at a substantially similar time as when the vehicle stops at the refueling station based on the estimated duration.

3. The system of claim 1, wherein controlling the thermal management system of the fuel vapor storage canister further comprises controlling a temperature of the fuel vapor canister to or below a threshold canister temperature; and
wherein the controller stores further instructions to control the temperature of the fuel vapor canister so that the threshold canister temperature is reached at a substantially similar time as when the vehicle stops at the refueling station based on the estimated duration.

4. A method comprising:
via a controller, preparing an energy receiving apparatus of a vehicle for receiving an increase in a level of energy storage from an energy replenishment station while the vehicle is traveling to the energy replenishment station, in response to a vehicle operator confirming at the controller an intent to stop at the energy replenishment station to increase the level of energy storage at the energy receiving apparatus.

5. The method of claim 4, wherein confirming the intent to stop at the energy replenishment station is in response to a request via the controller to confirm the intent.

6. The method of claim 5, wherein the request is generated in response to an indication that the vehicle is within a predetermined proximity to the energy replenishment station.

7. The method of claim 5, wherein the request is in a form of an audible or visual request generated via the controller.

8. The method of claim 4, wherein confirming at the controller the intent to stop is via an audible or manual confirmation via the operator.

9. The method of claim 4, wherein the energy replenishment station comprises a refueling station and where the energy receiving apparatus comprises a fuel tank.

10. The method of claim 9, wherein preparing the energy receiving apparatus of the vehicle for receiving the increase in a level of energy storage further comprises depressurizing the fuel tank while the vehicle is traveling to the refueling station.

11. The method of claim 9, wherein preparing the energy receiving apparatus of the vehicle further comprises controlling a temperature of a fuel vapor storage canister that captures and stores fuel vapors from the fuel tank to below a threshold canister temperature.

12. The method of claim 4, wherein the energy replenishment station comprises a recharging station and where the energy receiving apparatus comprises a battery.

13. The method of claim 12, wherein preparing the energy receiving apparatus for receiving the increase in the level of energy storage further comprises controlling a temperature of the energy receiving apparatus to below an upper temperature threshold and above a lower temperature threshold.

14. The method of claim 13, wherein controlling the temperature includes controlling a rate and amount of current supplied to a thermoelectric heater or cooler.

15. A method comprising:
  detecting that a vehicle is within a predetermined proximity to a refueling station for increasing a level of liquid fuel at a fuel tank of the vehicle;
  requesting a response from an operator of the vehicle as to whether the vehicle will be driven to the refueling station to increase the level of liquid fuel at the fuel tank; and
  in response to the operator confirming in an affirmative that the vehicle will be driven to the refueling station to increase the level of liquid fuel at the fuel tank, controlling a fuel tank depressurization routine so that the fuel tank is depressurized to below a threshold fuel tank pressure at a substantially similar time as when the vehicle arrives at the refueling station.

16. The method of claim 15, wherein the substantially similar time comprises within one minute or less of the vehicle arriving at the refueling station.

17. The method of claim 15, further comprising, in response to the vehicle operator confirming that the vehicle will not be driven to the refueling station to increase the level of liquid fuel at the fuel tank, postponing controlling the fuel tank depressurization routine.

18. The method of claim 15, wherein requesting the response is via an audible message communicated to the vehicle operator; and
  wherein the operator confirming in the affirmative is via an audible response to the request.

19. The method of claim 15, wherein controlling the fuel tank depressurization involves controlling a duty cycle of a fuel tank isolation valve that seals the fuel tank from atmosphere.

20. The method of claim 15, further comprising subsequent to increasing the level of liquid fuel at the fuel tank, conducting a pressure-based diagnostic on the fuel tank to determine whether a fuel dispensing nozzle for increasing the level of liquid fuel at the fuel tank remains mechanically coupled to the vehicle; and
  in response to an indication that the fuel dispensing nozzle remains mechanically coupled to the vehicle, issuing an alert to the operator to remove the fuel dispensing nozzle and preventing the vehicle from being moved until confirmation is received that the fuel dispensing nozzle has been decoupled from the vehicle.

* * * * *